United States Patent
Li et al.

(10) Patent No.: US 11,948,370 B2
(45) Date of Patent: *Apr. 2, 2024

(54) PRECISE PARKING METHOD, APPARATUS AND SYSTEM OF TRUCK IN SHORE-BASED CRANE AREA

(71) Applicant: Beijing Tusen Zhitu Technology Co., Ltd., Beijing (CN)

(72) Inventors: Yiming Li, Shanghai (CN); Yuhe Jin, Shanghai (CN); Jinpeng Cai, Shanghai (CN); Nan Wu, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 143 days.

This patent is subject to a terminal disclaimer.

(21) Appl. No.: 17/360,743

(22) Filed: Jun. 28, 2021

(65) Prior Publication Data
US 2021/0327271 A1    Oct. 21, 2021

Related U.S. Application Data

(63) Continuation of application No. PCT/CN2019/077078, filed on Mar. 6, 2019.

(30) Foreign Application Priority Data

Dec. 26, 2018  (CN) .......................... 201811602321.3

(51) Int. Cl.
| | | |
|---|---|---|
| *G06V 20/58* | (2022.01) | |
| *B60W 30/06* | (2006.01) | |
| *G08G 1/14* | (2006.01) | |

(52) U.S. Cl.
CPC .......... *G06V 20/586* (2022.01); *B60W 30/06* (2013.01); *G08G 1/142* (2013.01); *G08G 1/148* (2013.01);

(Continued)

(58) Field of Classification Search
CPC ................ G06V 20/586; B60W 30/06; B60W 2552/53; B60W 2420/52; G08G 1/142; G08G 1/149
See application file for complete search history.

(56) References Cited

U.S. PATENT DOCUMENTS

| | | | |
|---|---|---|---|
| 10,078,790 B2 | 9/2018 | Wang et al. | |
| 2014/0244095 A1* | 8/2014 | Choi .................... | B62D 15/029 701/25 |

(Continued)

FOREIGN PATENT DOCUMENTS

| | | |
|---|---|---|
| CN | 104528531 A | 4/2015 |
| CN | 204384730 U | 6/2015 |

(Continued)

OTHER PUBLICATIONS

Machine translation CN109335716A (Year: 2019).*

(Continued)

*Primary Examiner* — Kam Wan Ma
(74) *Attorney, Agent, or Firm* — Perkins Coie LLP

(57) ABSTRACT

The present disclosure provides a method, a device, and a system for parking a truck. The method includes a main controller acquiring real-time point cloud data by scanning a lane crossed by a shore crane using a laser radar; the main controller clustering the real-time point cloud data to obtain a set of point clouds for the truck moving in the lane; and the main controller obtaining a real-time distance from the moving truck to a target parking space based on the set of point clouds and a vehicle point cloud model; the main controller broadcasting a message containing the real-time distance, such that a vehicle controller controls the moving truck to stop at the target parking space based on the real-time distance contained in the message.

20 Claims, 7 Drawing Sheets

(52) U.S. Cl.
CPC ......... *G08G 1/149* (2013.01); *B60W 2420/52* (2013.01); *B60W 2552/53* (2020.02)

(56) References Cited

U.S. PATENT DOCUMENTS

| | | | | |
|---|---|---|---|---|
| 2016/0163205 A1* | 6/2016 | Jenkins | ............... | G08G 5/0069 701/3 |
| 2017/0323505 A1* | 11/2017 | Gaddam | ............... | H04L 63/08 |
| 2018/0374235 A1* | 12/2018 | Kamata | ............... | G06V 20/58 |
| 2019/0025846 A1* | 1/2019 | Wu | ............... | H04W 4/40 |

FOREIGN PATENT DOCUMENTS

| | | | | |
|---|---|---|---|---|
| CN | 106495000 A | | 3/2017 | |
| CN | 106541945 A | | 3/2017 | |
| CN | 106781670 A | | 5/2017 | |
| CN | 107338988 A | | 11/2017 | |
| CN | 107390689 A | | 11/2017 | |
| CN | 107610524 A | | 1/2018 | |
| CN | 107807633 A | | 3/2018 | |
| CN | 108362294 A | * | 8/2018 | ............ G01C 21/32 |
| CN | 108846393 A | | 11/2018 | |
| CN | 109035841 A | | 12/2018 | |
| CN | 109335716 A | * | 2/2019 | |
| CN | 110874944 B | * | 4/2021 | ............ B60W 30/06 |
| DE | 1020182 A1 | | 11/2018 | |
| GB | 2559885 A | | 8/2018 | |
| WO | 20180419 A1 | | 4/2018 | |

OTHER PUBLICATIONS

Machine translation CN110874944A (Year: 2021).*
International Application No. PCT/CN2019/077078, International Search Report and Written Opinion dated Jul. 2, 2020 (pp. 1-9).
Chinese Application No. 201811602321 First Search dated Mar. 20, 2021, pp. 1-2.
Chinese Application No. 201811602321 First Office Action dated Mar. 30, 2021, pp. 1-17.

* cited by examiner

PRECISE PARKING METHOD, APPARATUS AND SYSTEM OF TRUCK IN SHORE-BASED CRANE AREA

CROSS-REFERENCE TO RELATED APPLICATIONS

The present disclosure is a continuation of and claims priority to International Application No. PCT/CN2019/077078, entitled PRECISE PARKING METHOD, APPARATUS AND SYSTEM OF TRUCK IN SHORE-BASED CRANE AREA, and filed Mar. 6, 2019 and which claims priority to and the benefit of Chinese Patent Application No. 201811602321.3, titled "PRECISE PARKING METHOD, APPARATUS AND SYSTEM OF TRUCK IN SHORE-BASED CRANE AREA", filed on Dec. 26, 2018, the content of which is incorporated herein by reference in its entirety.

TECHNICAL FIELD

The embodiments of the present disclosure relate to intelligent traffic technology, and more particularly, to a method, a device, and a system for parking a truck accurately in a shore crane area.

BACKGROUND

This section is intended to provide a background or context for the embodiments of the present disclosure as set forth in the claims. The description here is not admitted to be prior art by mere inclusion in this section.

Current vehicle parking schemes typically locate vehicles and parking spaces by using vehicle-mounted positioning devices or vehicle-mounted cameras. Such schemes have disadvantages such as large errors and slow speeds, and are especially not suitable for accurate parking of large trucks.

Shore container cranes, also known as shore cranes, are dedicated cranes for loading/unloading containers onto/from ships at ports and docks. They mainly use dedicated container spreaders for loading/unloading containers onto/from ships. The loading/unloading efficiency of shore cranes directly affects the goods transportation capacity of the port. Efficient loading/unloading operations of shore cranes impose high requirements on parking of trucks, requiring the trucks to be parked quickly and accurately at target parking spaces under shore cranes.

SUMMARY

However, in the existing operations of loading/unloading containers onto/from ships, trucks typically cannot stop accurately at target parking spaces once for all after braking, and the trucks need to be guided manually to move forward and backward to stop accurately, which greatly reduces the efficiency of the operations of loading/unloading containers onto/from ships. Therefore, whether the trucks can be accurately parked becomes a technical difficulty in the current operations of loading/unloading containers onto/from ships.

In view of the above problem, the present disclosure provides a method, a device, and a system for parking a truck accurately in a shore crane area, capable of overcoming or at least partially solving the above problem.

In a first aspect of the embodiments of the present disclosure, a method applied in a main controller for parking a truck accurately in a shore crane area is provided. The method includes: acquiring real-time point cloud data obtained by scanning a lane crossed by a shore crane using a Light Detection and Ranging (LiDAR); clustering the real-time point cloud data to obtain a set of point clouds for a truck moving in the lane; applying an Iterative Closest Point (ICP) algorithm to the set of point clouds for the moving truck and a vehicle point cloud model to obtain a real-time distance from the moving truck to a target parking space, the vehicle point cloud model being a set of point clouds obtained by scanning a truck parked at the target parking space using the LiDAR in advance; and broadcasting a message containing the real-time distance, such that a vehicle controller corresponding to the moving truck controls the moving truck to stop at the target parking space based on the real-time distance contained in the message.

In a second aspect of the embodiments of the present disclosure, a method applied in a vehicle controller for parking a truck accurately in a shore crane area is provided. The method includes: receiving a message broadcasted by a main controller; and controlling a truck corresponding to itself to stop at a target parking space based on a real-time distance contained in the message. The message contains the real-time distance from the truck moving in a lane crossed by a shore crane to a target parking space. The real-time distance is calculated by the main controller by: acquiring real-time point cloud data obtained by scanning the lane crossed by the shore crane using a LiDAR; clustering the real-time point cloud data to obtain a set of point clouds for the truck moving in the lane; and applying an Iterative Closest Point (ICP) algorithm to the set of point clouds for the moving truck and a vehicle point cloud model to obtain the real-time distance from the moving truck to a target parking space. The vehicle point cloud model is a set of point clouds obtained by scanning a truck parked at the target parking space using the LiDAR in advance.

In a third aspect of the embodiments of the present disclosure, a main controller is provided. The main controller includes a first processor, a first memory, and a computer program stored on the first memory and executable on the first processor. The first processor is configured to, when executing the computer program, perform the steps of the above method applied in a main controller for parking a truck accurately in a shore crane area.

In a fourth aspect of the embodiments of the present disclosure, a vehicle controller is provided. The vehicle controller includes a second processor, a second memory, and a computer program stored on the second memory and executable on the second processor. The second processor is configured to, when executing the computer program, perform the steps of the above method applied in a vehicle controller for parking a truck accurately in a shore crane area.

In a fifth aspect of the embodiments of the present disclosure, a system for parking a truck accurately in a shore crane area is provided. The system includes the above main controller, the above vehicle controller, and a LiDAR.

In a sixth aspect of the embodiments of the present disclosure, a shore crane is provided. The shore crane is provided with a LiDAR and the above main controller.

In a seventh aspect of the embodiments of the present disclosure, a vehicle is provided. The vehicle is provided with the above vehicle controller.

In an eighth aspect of the embodiments of the present disclosure, a computer readable storage medium is provided. The computer readable storage medium has a computer program stored thereon. The computer program, when executed by a processor, implements the steps of the above method applied in a main controller for parking a truck accurately in a shore crane area.

In a ninth aspect of the embodiments of the present disclosure, a computer readable storage medium is provided. The computer readable storage medium has a computer program stored thereon. The computer program, when executed by a processor, implements the steps of the above method applied in a vehicle controller for parking a truck accurately in a shore crane area.

With the above technical solutions, the present disclosure calculates the real-time distance from the truck to the target parking space using the ICP algorithm, and controls the truck to stop at the target parking space accurately once for all based on the real-time distance. The entire parking process is automated without human intervention, capable of achieving centimeter-level accuracy with a low implementation cost and a high portability.

The other features and advantages of the present disclosure will be explained in the following description, and will become apparent partly from the description or be understood by implementing the present disclosure. The objects and other advantages of the present disclosure can be achieved and obtained from the structures specifically illustrated in the written description, claims and figures.

In the following, the solutions according to the present disclosure will be described in further detail with reference to the figures and embodiments.

BRIEF DESCRIPTION OF THE DRAWINGS

The above and other objects, features and advantages of the exemplary embodiments of the present disclosure will become more apparent from the following detailed description with reference to the figures. In the figures, a number of embodiments of the present disclosure are shown for illustrating, rather than limiting the present disclosure. In the figures.

Throughout the figures, same or corresponding reference numerals indicate same or corresponding elements.

DETAILED DESCRIPTION OF THE EMBODIMENTS

Figure 1:
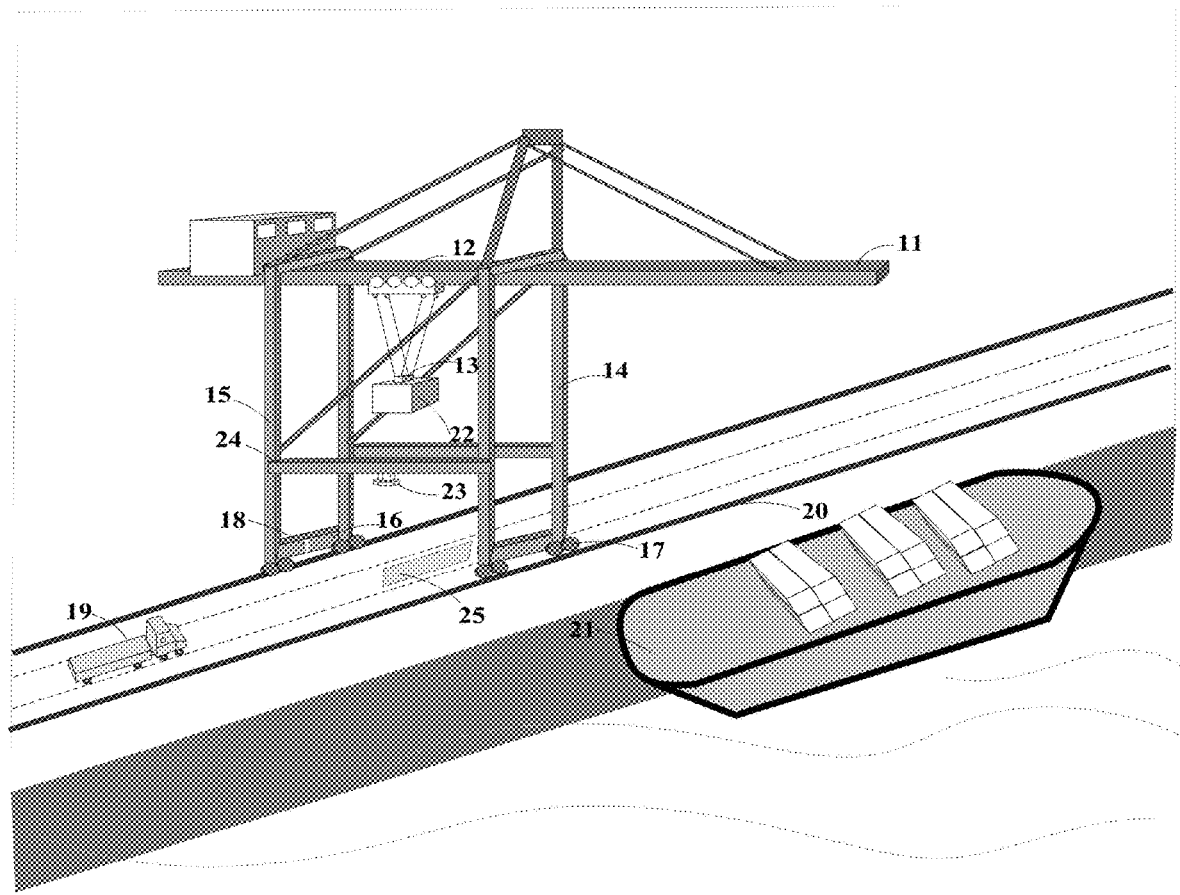
FIG. 1 schematically shows an application scenario according to an embodiment of the present disclosure.

The principles and spirits of the present disclosure will be described below with reference to a number of exemplary embodiments. It is to be understood that the embodiments are presented only to enable those skilled in the art to better understand the present disclosure, instead of limiting the scope of the present disclosure in any way. Rather, these embodiments are provided to make the present disclosure more thorough and complete and to fully convey the scope of the present disclosure to those skilled in the art.

It can be appreciated by those skilled in the art that the embodiments of the present disclosure can be implemented as a system, apparatus, device, method, or computer program product. Accordingly, the present disclosure may be implemented in hardware only, software only (including firmware, resident software, micro codes, etc.), or any combination of hardware and software.

In order to facilitate understanding of the present disclosure, some of the technical terms used in the present disclosure will be explained as follows:

(1) Target parking space: a position of a truck where a spreader of a shore crane can just lift a container on a load board of the truck or unload a container onto the load board of the truck. Since lanes crossed by the shore crane are parallel and a bridge frame of the shore crane is perpendicular to the lanes, each lane has a target parking space. Along the direction in which each lane extends, the target parking space of the lane has a front end and a rear end. In the direction perpendicular to the lanes, the front ends of the target parking spaces of the respective lanes are in a same straight line, and the rear ends of the target parking spaces of the respective lanes are located on a same straight line.

(2) Parking marking line: a marking indicating that a truck is stopping at a target parking space, e.g., a vertical line drawn on a door frame beam of a shore crane. When the truck stops according to the parking marking line, the truck stops right at the target parking space. Since lanes crossed by the shore crane are parallel, and a bridge frame of the shore crane is perpendicular to the lanes, the target parking spaces of the respective lanes correspond to a same parking marking line.

(3) Iterative Closest Points (ICP) algorithm: an algorithm that can be used to calculate a translation matrix and a rotation matrix between different sets of points.

(4) The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

(5) The term "autonomous vehicle" as used herein refers to any vehicle using the autonomous driving technology to carry people (such as passenger cars, buses, etc.) or goods (such as ordinary trucks, vans, closed trucks, tank trucks, flatbed trucks, container trucks, dump trucks, trucks with special structures, etc.) or provide special rescue functions (such as fire trucks, ambulances, etc.).

It is to be noted that any number of elements in the figures is used as non-limiting examples and any notation is used for the purpose of distinguishing, rather than limiting.

Overview of the Present Disclosure

FIG. 1 is a schematic diagram showing an operation of loading/unloading a container onto/from a ship. As shown in FIG. 1, a shore crane includes a bridge frame 11, a trolley movement mechanism 12, a spreader 13, a sea side door frame 14, a land side door frame 15, a door frame beam 16, a crane movement mechanism 17, a connecting beam 24, and other structures. Here, the connecting beam 24 is a beam that connects the sea side door frame 14 and the land side door frame 15 and crosses a plurality of parallel lanes. Trucks 19 can move freely in these lanes.

During the operation of loading/unloading the container onto/from the ship, the crane movement mechanism 17 moves along a shore rail 20 such that the bridge frame 11 faces a container position of the ship 21. The trolley movement mechanism 12 moves along the bridge frame 11, and the spreader 13 is mounted under the trolley movement mechanism 12 and moves along with it. In the operation of loading the container onto the ship, the spreader 13 moves along the bridge frame 11 to a load board of the truck 19 on which the container is loaded to lift the container 22, and then moves to the container position of the ship 21 to unload the container 22. In the operation of unloading the container from the ship, the spreader 13 moves along the bridge frame 11 to the container position of the ship 21 to lift the container 22, and then moves to the load board of the truck 19 to unload the container 22.

When the container 22 is hoisted, the spreader 13 moves along the bridge frame 11 to operate on the trucks 19 in different lanes. However, the spreader 13 can only move along the bridge frame 11 and cannot move along the direction in which the lanes extend. Thus, along the direction in which the lanes extend, it is necessary for the truck 19 to stop at a position that enables the spreader 13 to lift the container 22 on the load board of the truck 19 or enables the spreader 13 to unload the container 22 onto the load board of the truck 19. That is, the truck 19 needs to stop accurately at the target parking space 25.

In order to allow the truck 19 to accurately stop at the target parking space 25, a parking marking line 18 is drawn on the door frame beam 16 of the shore crane. When the truck 19 stops according to the parking marking line 18, the spreader 13 of the shore crane can just lift the container 22 on the load board of the truck 19 or unload the container 22 onto the load board of the truck 19. Generally, the truck 19 stopping according to the parking marking line 18 means that the truck 19 stops when the truck 19 moves to a position where a side plane of the load board of the truck at the rear of the vehicle (previously referred to as rear side plane of the load board) is coplanar with a vertical plane where the parking marking line 18 is located.

However, after the truck 19 brakes, it is typically different to make the rear side plane of the load board to be coplanar with and the vertical plane where the parking marking line 18 is located once for all. That is, it cannot accurately stop at the target parking space 25 once for all. The truck 19 needs to be guided manually to move forward and backward to stop accurately, which greatly reduces the efficiency of the operations of loading/unloading the container onto/from the ship. Therefore, whether the truck 19 can be accurately parked becomes a technical difficulty in the current operations of loading/unloading containers onto/from ships.

There are some technical solutions to the above problems, for example:

(1) Some technical solutions use a vehicle-mounted GPS or RTK positioning device to collect a position of a truck to control the truck to stop. However, the GPS or RTK positioning device has strict requirements on the environment and requires the surrounding environment to be open and unobstructed. During the operation of loading/unloading a container onto/from a ship, the truck will stay under the bridge frame of the shore crane, and the large steel structures of the shore crane, such as the sea/land side door frame, the bridge frame, and the beam will seriously block signals of the GPS and RTK positioning device. When the truck enters a certain range around the shore crane, it is impossible to rely on the GPS or RTK positioning device to obtain accurate positioning of the truck itself.

(2) Some technical solutions use vehicle-mounted cameras to visually locate the parking marking line to control the truck to stop. However, due to limitation in algorithms and computing power, such solutions cannot achieve parking with centimeter-level accuracy.

(3) Some other technical solutions use vehicle-mounted LiDARs to locate the parking marking line to control the truck to stop. Such solutions require the area on the shore where the operations of loading/unloading contains onto/from ships may be carried out to be covered with high-reflectivity paint. For busy ports, the paint may be worn seriously and needs to be repaired frequently, resulting in a high cost.

To summarize, it is difficult for the existing solutions to park the truck accurately with vehicle-mounted devices only, and such solutions have high requirements on the vehicle-mounted devices, and have disadvantages such as low accuracy, high cost, low portability, and difficulty in large-scale application.

In view of this, the present disclosure provides a solution for parking a truck accurately in a shore crane area. The solution first uses a LiDAR to scan a truck that has parked at a target parking space to obtain a vehicle point cloud model, and then uses a LiDAR to scan a truck moving towards the target parking space in real time during an operation of loading/unloading a container onto/from a ship, to obtain a set of point clouds for the truck. Next, an ICP algorithm is applied to the set of point clouds and the vehicle point cloud model to obtain the real-time distance from the truck to the target parking space. Finally, the truck is controlled to stop accurately at the target parking space based on the real-time distance.

The solution for parking a truck accurately in a shore crane area according to the present disclosure can achieve centimeter-level accuracy with a low implementation cost and a high portability.

After introducing the basic principles of the present disclosure, various non-limiting embodiments of the present disclosure will be described in detail below.

Overview of Application Scenario

The embodiment of the present disclosure provides an illustrative application scenario. As shown in FIG. 1, a ship berths at a port and a shore crane is located on a shore of the ship's berth. A connecting beam 24 of the shore crane crosses a plurality of lanes, and trucks move in these lanes. A LiDAR 23 provided at the bottom of the connecting beam 24 of the shore crane scans these lanes to obtain real-time point cloud data.

A main controller acquires real-time point cloud data obtained by scanning using the LiDAR 23 in real time, clusters the real-time point cloud data to obtain sets of point clouds for trucks moving in these lanes, then applies an ICP algorithm to the sets of point clouds for the trucks and vehicle point cloud models to obtain real-time distances from the trucks to target parking spaces, and finally broadcasts messages containing the real-time distances from the trucks to the target parking space. Upon receiving the messages, vehicle controllers of the trucks control the trucks to stop at the target parking spaces based on the real-time distances contained in the messages.

It is to be noted that the application scenario shown in FIG. 1 is provided only for facilitating understanding of the spirits and principles of the present disclosure, rather than limiting the embodiments of the present disclosure in any way. The embodiments of the present disclosure can be applied to any appropriate scenario.

Exemplary Methods

Figure 2:
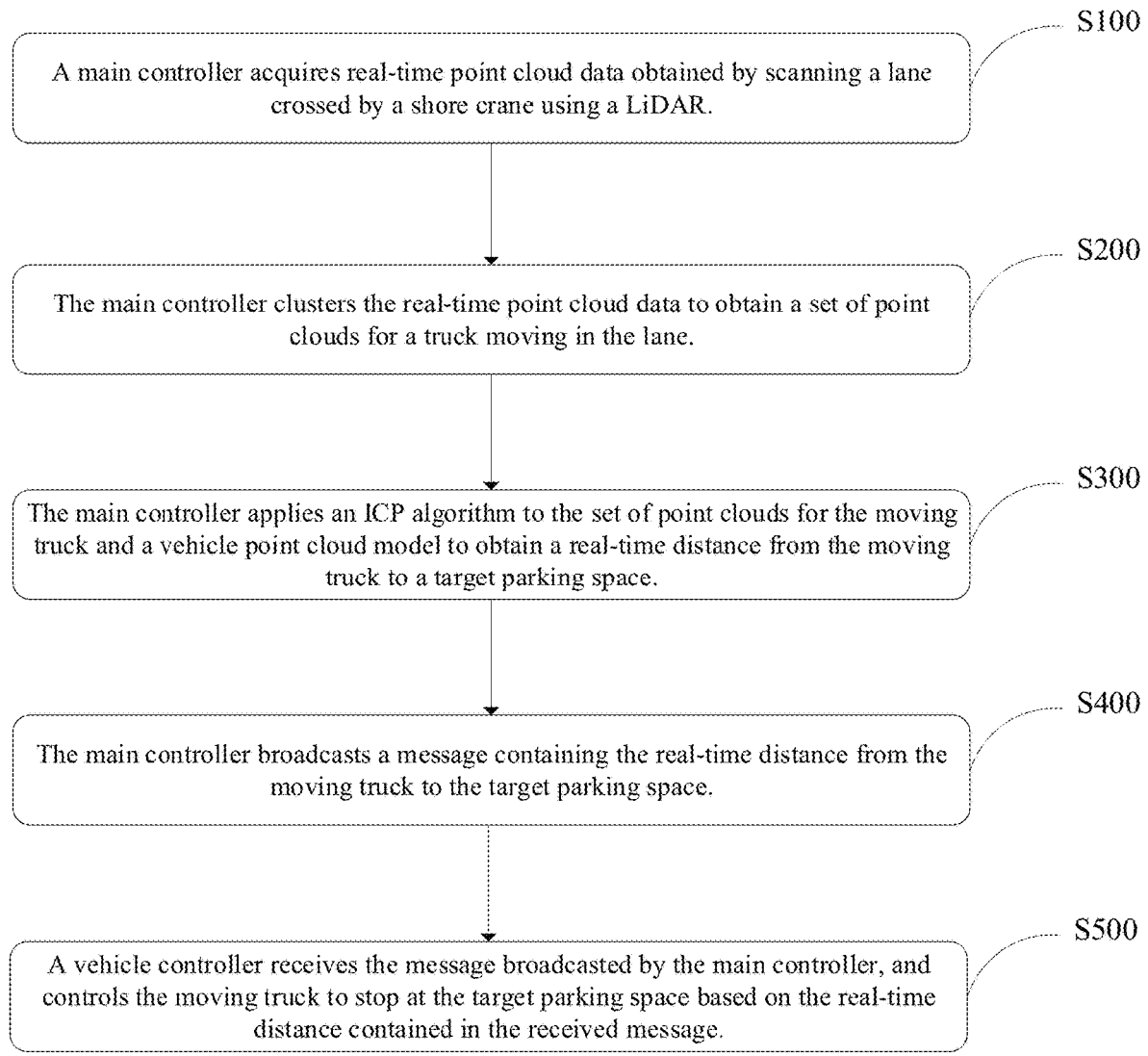
FIG. 2 schematically shows a flow of a method for parking a truck accurately in a shore crane area according to an embodiment of the present disclosure.

In the following, the method for parking a truck accurately in a shore crane area according to an embodiment of the present disclosure will be described with reference to FIG. 2 in conjunction with the application scenario of FIG. 1. As shown in FIG. 2, an embodiment of the present disclosure provides a method for parking a truck accurately in a shore crane area, including the following steps.

At step S100, a main controller acquires real-time point cloud data obtained by scanning a lane crossed by a shore crane using a LiDAR.

Figure 3:
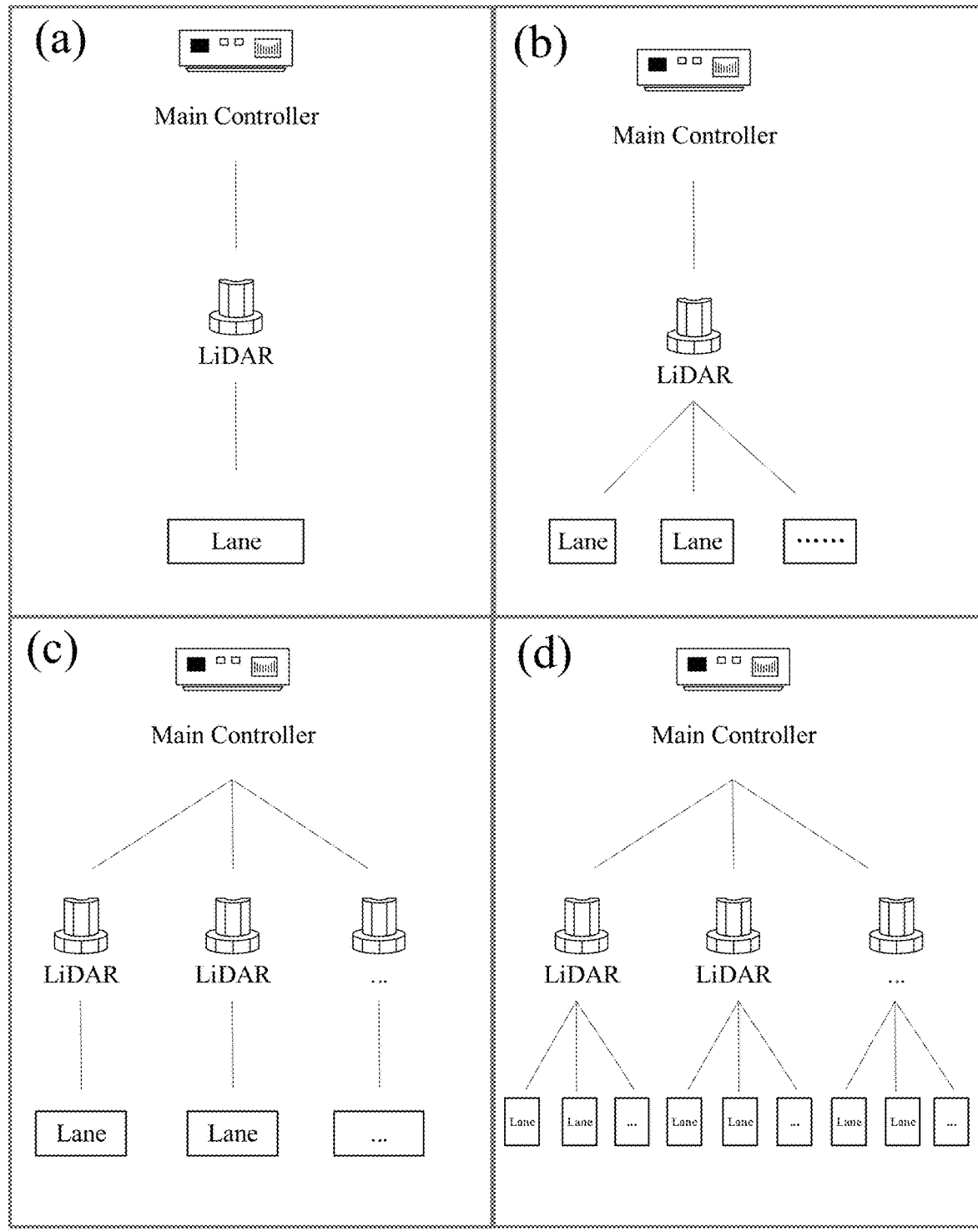
FIG. 3 schematically shows configuration modes of a main controller, one or more LiDARs, and one or more lanes according to an embodiment of the present disclosure.

Since the shore crane typically crosses a plurality of lanes, and the number of laser emission light sources (i.e., the number of lines) and the scanning range of a LiDAR are limited, in general one LiDAR cannot scan all the lanes crossed by the shore crane at the same time. Thus, a plurality of LiDARs need to be configured. In addition, the main controller and the LiDARs are independent devices, and there are various connection modes between them. Taking the above factors into account, in a specific implementation, the main controller, the LiDARs, and lanes can have a number of configuration modes as shown in FIG. 3:

(a) One main controller is connected to only one LiDAR, and one LiDAR is responsible for scanning only one lane;

(b) One main controller is connected to only one LiDAR, and one LiDAR is responsible for scanning at least two lanes;

(c) One main controller is connected to at least two LiDARs, and one LiDAR is responsible for scanning only one lane; and (d) One main controller is connected to at least two LiDARs, and one LiDAR is responsible for scanning at least two lanes.

In a specific implementation, it is possible to determine which configuration mode to use comprehensively based on a total number of lanes crossed by the shore crane, a width of each lane, and the number of lines and the scanning range of each LiDAR. The embodiment of the present disclosure is not limited to any of these examples.

At step S200, the main controller clusters the real-time point cloud data to obtain a set of point clouds for a truck moving in the lane.

In particular, when the truck moves in the lane crossed by the shore crane and enters the scanning range of the LiDAR, a laser beam will be radiated onto the truck and returned and received by the LiDAR. The real-time point cloud data obtained by scanning will contain point clouds corresponding to the truck. The set of point clouds for the truck can be extracted by clustering the real-time point cloud data.

In this step, algorithms that are currently commonly used for clustering arbitrary shapes, such as WaveCluster, ROCK, CURE, K-Prototypes, DENCLUE, DBSCAN, etc., can be used.

Since the shore crane typically crosses a number (for example, six) of lanes, there may be a plurality of trucks moving in these lanes at the same time. Therefore, the real-time point cloud data may contain point clouds corresponding to the plurality of trucks at the same time. In this case, clustering the real-time point cloud data may result in sets of point clouds for the plurality of trucks.

At step S300, the main controller applies an ICP algorithm to the set of point clouds for the moving truck as obtained by clustering and a vehicle point cloud model to obtain a real-time distance from the moving truck to a target parking space. Here, the vehicle point cloud model is a set of point clouds obtained by scanning a truck parked at the target parking space using the LiDAR in advance.

The ICP algorithm can be used to calculate a translation matrix and a rotation matrix between different sets of points. The set of point clouds obtained by clustering is a set of points corresponding to the truck that is moving, and the vehicle point cloud model is a set of points for a truck accurately parked at the target parking space. Therefore, by applying the ICP algorithm to the above two sets of points, a translation matrix and a rotation matrix between the truck that is moving and the truck accurately parked at the target parking space. Since the trucks can only move in the lane, the rotation matrix between them can be negligible. According to the translation matrix between them, the real-time distance from the truck that is moving to the target parking space can be obtained.

Since the trucks for operations of loading/unloading container onto/from ships at the port may have different vehicle models, the sets of point clouds obtained by scanning trucks of different models using the LiDAR will be different. Therefore, in some embodiments, the LiDAR can be configured to scan a plurality of trucks of different vehicle models parked at the target parking space in advance to obtain a plurality of vehicle point cloud models, and store the vehicle point cloud models in a model library. On this basis, the step S300 can be performed as follows. The main controller can determine the vehicle model of the truck, select the vehicle point cloud model matching the vehicle model of the truck from the model library, and apply the ICP algorithm to the set of point clouds for the truck as obtained by clustering and the vehicle point cloud model matching the vehicle model of the truck.

For example, the model library may include a plurality of vehicle point cloud models, a, b, c, d, e, f, and g, corresponding to vehicle models A, B, C, D, E, F, and G, respectively. When the vehicle model of the truck is F, the main controller can determine that the vehicle point cloud model matching the vehicle model of the truck is f, and then apply the ICP algorithm to the set of point clouds for the truck and f.

In order to ensure that all trucks arriving at shore cranes to perform operations of loading/unloading containers onto/from ships can find matching vehicle point cloud models for their respective sets of point clouds, in a specific implementation, the model library needs to include vehicle point cloud models for all vehicle models of trucks performing operations of loading/unloading containers onto/from ships in the port. When a truck of a new vehicle model is added, the vehicle point cloud models in the model library also need to be updated accordingly.

Since the operations of loading/unloading containers onto/from ships can be divided into two types of operations: loading containers onto ships and unloading containers from ships. In an operation of loading a container onto a ship, the truck carries the container to the target parking space under the shore crane, and the spreader lifts the container from the load board of the truck to the ship. In this process, when the truck is moving towards the target parking space, it has the container on its load board. In an operation of unloading a container from a ship, the truck moves to and stops at the target parking space under the shore crane, and the spreader lifts the container from the ship to the load board of the truck. The truck then carries the container to a yard for storage. In this process, when the truck is moving towards the target parking space, the load board is empty. It can be seen that in the operation of loading the container onto the ship and the operation of unloading the container from the ship, the truck moving towards the target parking space may have two possibilities: carrying a container and carrying no container. Correspondingly, the sets of point clouds obtained in these two cases are also different.

Therefore, in some embodiments, trucks of a plurality of different vehicle models that are parked at the target parking space and carrying containers can be scanned using the LiDAR in advance, to obtain a plurality of vehicle point cloud models and store them in a first model library. Trucks of the plurality of different vehicle models that are parked at the target parking space and carrying no container can be scanned using the LiDAR in advance, to obtain a plurality of vehicle point cloud models and store them in a second model library. The main controller can select the vehicle point cloud model matching the vehicle model of the truck from the model library as follows. When the main controller determines that the truck carries a container, it can select the vehicle point cloud model matching the vehicle model of the truck from the first model library. When the main controller determines that the truck carries no container, it can select the vehicle point cloud model matching the vehicle model of the truck from the second model library.

In order to ensure that all trucks arriving at shore cranes to perform operations of loading/unloading containers onto/from ships can find matching vehicle point cloud models for their respective sets of point clouds, in a specific implementation, the first model library and the second model library need to include vehicle point cloud models for all vehicle models of trucks performing operations of loading/unloading containers onto/from ships in the port. When a truck of a new vehicle model is added, the vehicle point cloud models in the first model library and the second model library also need to be updated accordingly.

In some embodiments, the main controller can determine the vehicle model of the moving truck by: capturing an image of the moving truck; performing visual identification on the image to obtain a vehicle identification; and determining the vehicle model of the moving truck based on a known correspondence between vehicle identifications and vehicle models. Here, the vehicle identification may be a vehicle number.

In order to increase the success rate of capturing the vehicle identification, in some embodiments, the main controller can capture an image of a predetermined area of a vehicle body of the truck using a camera. For example, the predetermined area of the vehicle body may be an area where a license plate is mounted (e.g., a rear side plane) or another area where a clearly identifiable vehicle identification is provided (e.g., a top of a vehicle head).

In order to improve the efficiency of visual identification of the vehicle identification, in some embodiments, the predetermined area of the vehicle body may have the vehicle identification formed by a reflective coating. Here, the reflective coating has a high reflective rate, such that the vehicle identification can be easily identified by performing vehicle identification on the captured image.

In some embodiments, the main controller can determine the vehicle model of the moving truck by: reading the vehicle model of the moving truck as stored in a Radio Frequency Identification (RFID) tag provided on the moving truck using an RFID reader.

In some embodiments, the main controller can determine whether the moving truck carries a container by: capturing an image of the moving truck; and performing visual identification on the image to determine whether the moving truck carries a container.

The ICP algorithm can be used to calculate a rotation matrix and a translation matrix between the set of point clouds for the truck as obtained by clustering and the vehicle point cloud model in an iterative manner. Here, as all trucks move along the lane to the target parking space, there is no rotation between the set of point clouds for the truck and the vehicle point cloud model. The rotation matrix can be an identity matrix, and only the translation matrix needs to be calculated. In the iterative process of the ICP algorithm, an initial translation matrix to be used is a very important to the accuracy of the final calculation result.

In some embodiments, in the step S300, the main controller can apply the ICP algorithm to the set of point clouds for the moving truck and the vehicle point cloud model to obtain the real-time distance from the moving truck to the target parking space by: calculating a translation matrix from the set of point clouds for the moving truck to the vehicle point cloud model using the ICP algorithm; and obtaining the real-time distance from the moving truck to the target parking space based on the translation matrix.

The embodiment of the present disclosure provides the following scheme for determining the initial translation matrix. A predetermined number of foremost points in a moving direction of the truck in the set of point clouds for the truck and the predetermined number of foremost points in the moving direction of the truck in the vehicle point cloud model are determined respectively. An average center of the predetermined number of foremost points in the moving direction of the truck in the set of point clouds for the truck is determined as a first average center. An average center of the predetermined number of foremost points in the moving direction of the truck in the vehicle point cloud model is determined as a second average center. Here, coordinates of the first average center are average values of coordinates of the predetermined number of points in the set of point clouds for the truck, and coordinates of the second average center are average values of coordinates of the predetermined number of points in the vehicle point cloud model. The matrix for translating the first average center to the second average center is determined as the initial translation matrix.

Figure 4:
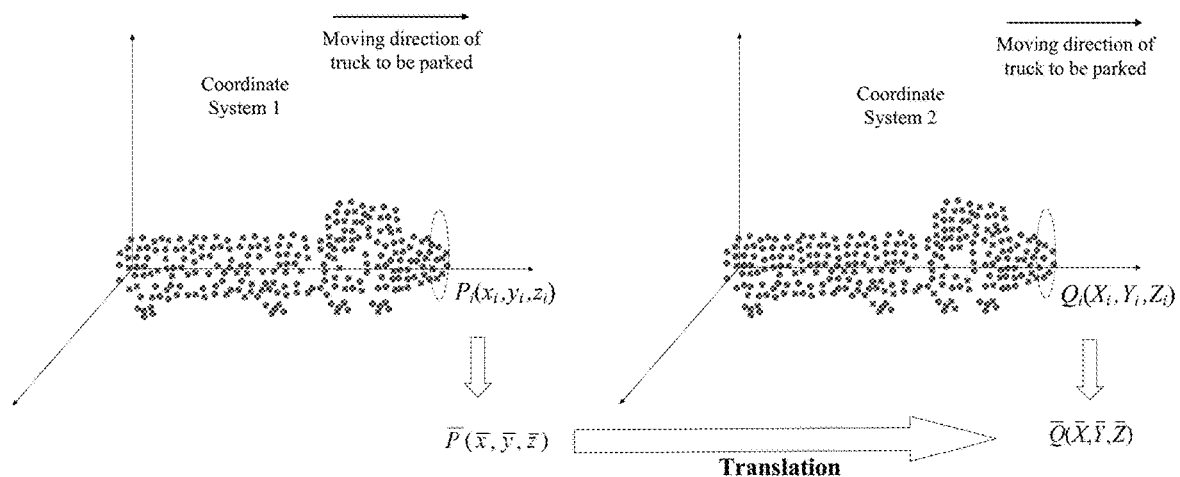
FIG. 4 schematically shows a process for determining an initial translation matrix according to an embodiment of the present disclosure.

As shown in FIG. 4, the set of point clouds for the truck is in Coordinate System 1, and the vehicle point cloud model is in Coordinate System 2. The n foremost points in the moving direction of the truck in the set of point clouds for the truck (identified by a dashed box) are $P_i(x_i,y_i,z_i)$, where i=1, 2, 3, . . . , n. The first average center is $\overline{P(\overline{x},\overline{y},\overline{z})}$, where $$\bar{x} = \frac{\sum_{i=1}^{n} x_i}{n}, \bar{y} = \frac{\sum_{i=1}^{n} y_i}{n}, \text{ and } \bar{z} = \frac{\sum_{i=1}^{n} z_i}{n}.$$

The n foremost points in the moving direction of the truck in the vehicle point cloud model (identified by a dashed box) are $Q_i(X_i, Y_i, Z_i)$, where i=1, 2, 3, ..., n. The second average center is $\overline{Q}(\overline{X}, \overline{Y}, \overline{Z})$, where $$\bar{x} = \frac{\sum_{i=1}^{n} x_i}{n}, \bar{y} = \frac{\sum_{i=1}^{n} y_i}{n}, \text{ and } \bar{z} = \frac{\sum_{i=1}^{n} z_i}{n}.$$

The matrix for translating the first average center $\overline{P}(\bar{x}, \bar{y}, \bar{z})$ to the second average center $\overline{Q}(\overline{X}, \overline{Y}, \overline{Z})$ is determined as the initial translation matrix.

The vehicle point cloud model is a set of points for a truck that are accurately parked at the target parking space, and the set of point clouds for the truck as obtained by clustering is a set of points for the truck that is moving. Thus, by applying the ICP algorithm to the set of point clouds for the truck as obtained by clustering and the vehicle point cloud model, the real-time distance from the truck that is moving to the target parking space can be obtained. In this process, the accuracy of the vehicle point cloud model has a direct impact on the accuracy of the final calculation result. However, current commonly used LiDARs have a limited number of lines (such as 32 lines or 64 lines). When a LiDAR at a fixed-position is used to scan a truck parked at the target parking space, due to the limitation in the number of laser beams and the emission direction, the beams can only reach a small area of the vehicle body of the truck, and the obtained point cloud data can only reflect the small area of the vehicle body of the truck. The set of point clouds (i.e., the vehicle point cloud model) obtained by clustering cannot fully reflect the position of the entire vehicle body of the truck, or even the vehicle point cloud model cannot be obtained by using the clustering algorithm.

In order to overcome the above problem, in some embodiments, the vehicle point cloud model can be obtained according to steps S302 to S306.

At step S302, a truck that moves towards the target parking space and finally stops at the target parking space is scanned using the LiDAR in advance.

In some embodiments, the truck that moves towards the target parking space and finally stops at the target parking space refers to a truck that moves towards a predetermined parking marking line and stops in accordance with the parking marking line.

For example, the parking marking line may be a vertical line drawn on the door frame beam of the shore crane and provided for a front side plane or a rear side plane of the load board. The truck moves towards the parking marking line and stops when the front side plane or the rear side plane of its load board is on a same vertical plane as the parking marking line.

In some embodiments, the parking marking line may be a vertical line drawn on the door frame beam of the shore crane and provided for the rear side plane of the load board. The truck moves towards the parking marking line and stops when the rear side plane of its load board is on a same vertical plane as the parking marking line.

At step S304, point cloud data when the truck has not reached the target parking space is converted into a coordinate system for point cloud data when the truck reaches the target parking space.

In a specific implementation, this process can use the ICP algorithm to achieve the conversion of the point cloud data between different coordinate systems.

At step S306: a set of point clouds obtained after the converting is determined as the vehicle point cloud model.

In the steps S302~S306, the moving truck is scanned using the LiDAR. This can allow the laser beam to reach more areas of the vehicle body of the truck. Correspondingly, the obtained point cloud data can reflect more areas of the vehicle body of the truck. The obtained vehicle point cloud model can also reflect more areas of the vehicle body of the truck, thereby better reflecting the position of the entire body of the truck, such that the requirements of the ICP algorithm can be satisfied and the accuracy of the calculation result can be improved.

Since front ends and rear ends of the respective lanes crossed by the shore crane are in a same straight line, and the real-time distance between the moving truck and the target parking space can be directly obtained based on the translation matrix between them, the target parking space in any of the lanes crossed by the shore crane can be selected to determine the vehicle point cloud model. The determined vehicle point cloud model can be used to calculate the real-time distance from a truck moving in any of the lanes to the target parking space.

At step S400, the main controller broadcasts a message containing the real-time distance from the moving truck to the target parking space.

At step S500, a vehicle controller receives the message broadcasted by the main controller, and controls the moving truck to stop at the target parking space based on the real-time distance contained in the received message.

Messages can be transmitted and received between the vehicle controller and the main controller by using wireless communication schemes such as WIFI, V2X, base station, etc. The present disclosure is not limited to any of these examples. For signal stability, the main controller and the vehicle controller can transmit and receive messages using V2X technology. In some embodiments, the main controller can broadcasts the message via V2X device, and the vehicle controller can receive the message via the V2X device.

In an embodiment of the present disclosure, each truck may be configured with a vehicle controller, which may be e.g., a vehicle-mounted device on the truck.

In some embodiments, the main controller can obtain sets of point clouds for a plurality of moving trucks by clustering the real-time point cloud data. Accordingly, it can calculate the real-time distance from each moving truck to the target parking space and broadcast a message containing the real-time distance from each moving truck to the target parking space. Here, one message may contain the real-time distance from one truck to the target parking space, or one message may contain the respective real-time distances from the plurality of trucks to the target parking space.

In this type of embodiment, since the message broadcasted by the master controller may contain the respective real-time distances of the plurality of trucks to the target parking space, correspondingly, after each vehicle controller receives the message broadcasted by the master controller, it needs to identify from the message which real-time distance is the real-time distance from the truck corresponding to itself to the target parking space. In order to solve this problem, the embodiments of the present disclosure provide the following schemes.

(1) In some embodiments, the vehicle controller can determine a real-time distance from the truck corresponding to itself to a target shore crane based on positioning data collected by a vehicle-mounted positioning device on the truck corresponding to itself and position information of the target shore crane, and compare the real-time distance from the truck corresponding to itself to the target shore crane with the real-time distance in the message, and if a difference between them is smaller than a predetermined threshold, control the truck corresponding to itself to stop at the target parking space based on the real-time distance contained in the message.

Here, the target shore crane is a shore crane for hoisting a container in a task of loading/unloading the container onto/from a ship as performed by the truck corresponding to the vehicle controller itself. For example, the vehicle controller may obtain the position information of the target shore crane from a received command for the task of loading/unloading the container onto/from the ship.

In this type of embodiment, the positioning data collected by the vehicle-mounted positioning device on the truck is rough positioning information of the truck (as there is a certain error in the positioning data collected by the vehicle-mounted positioning device). Based on the positioning information and the position information of the target shore crane, the real-time distance from the truck to the target shore crane can be calculated roughly. With the real-time distance as a standard, when it is determined that the real-time distance is very close to the real-time distance in the received message (the predetermined threshold can be set to a value close to 0), it can be determined that the real-time distance in the received message is the real-time distance from the truck corresponding to the vehicle controller itself to the target parking space. Then, the truck corresponding to the vehicle controller itself can be controlled to stop at the target parking space based on the real-time distance in the data pair containing the identification of the lane.

(2) In some embodiments, the main controller can determine an identification of the lane where the moving truck is located based on the set of point clouds for the moving truck and a known position of each lane crossed by the shore crane relative to the LiDAR, and include a data pair consisting of the identification of the lane where the moving truck is located and the real-time distance from the truck to the target parking space in the broadcasted message.

Then, after receiving the message broadcasted by the main controller, the vehicle controller can determine whether a lane of the truck corresponding to the vehicle controller itself corresponds to the identification of the lane contained in the received message. When it is determined that the two identifications correspond to each other, it can be determined that the real-time distance in the received message is the real-time distance from the truck corresponding to the vehicle controller itself to the target parking space. Then, the truck corresponding to the vehicle controller itself can be controlled to stop at the target parking space based on the real-time distance in the data pair containing the identification of the lane.

(3) In some embodiments, the main controller can capture an image of the moving truck, perform visual identification on the image to determine a vehicle identification, and include a data pair consisting of the vehicle identification of the moving truck and the real-time distance from the truck to the target parking space in the broadcasted message.

Then, after receiving the message broadcasted by the main controller, the vehicle controller can determine whether a vehicle identification of the truck corresponding to itself corresponds to the vehicle identification contained in the received message. When it is determined that the two identifications correspond to each other, it can be determined that the real-time distance in the received message is the real-time distance from the truck corresponding to the vehicle controller itself to the target parking space. Then, the truck corresponding to the vehicle controller itself can be controlled to stop at the target parking space based on the real-time distance in the data pair containing the identification of the lane.

Since not all the trucks moving in the lane crossed by the shore crane are trucks performing tasks of loading/unloading containers onto/from ships under the shore crane, in some embodiments, in the method for parking the truck accurately in the shore crane area according to an embodiment of the present disclosure may further include, after the vehicle controller receives the message broadcasted by the main controller, and before the vehicle controller controls the truck corresponding to itself to stop at the target parking space based on the real-time distance contained in the message: the vehicle controller determining whether the truck corresponding to itself is performing a task of loading/unloading a container onto/from a ship; and discarding the message when the truck corresponding to itself is not performing a task of loading/unloading a container onto/from a ship.

In order to ensure safe execution of operations of loading/unloading containers onto/from ships, the speed limit for the lanes crossed by the shore crane is generally set to be relatively low, such that the trucks can move in the lanes crossed by the shore crane at a relatively low speed. In view of this, in some embodiments, the step S500 can be performed as follows. When determining that the real-time distance from the truck to the target parking space is smaller than an unpowered coasting distance (that is, a distance that the truck can coast in an unpowered state) and a difference between them is smaller than or equal to a predetermined threshold, the vehicle controller can issue a throttle off signal to control the throttle of the truck to be off, such that the truck will coast to and stop at the target parking space.

In a specific implementation, the predetermined threshold can be set to a value close to 0, and the real-time distance from the truck to the target parking space being smaller than the unpowered coasting distance and the difference between them being smaller than or equal to the predetermined threshold may mean that the real-time distance from the truck to the target parking space is very close to the unpowered coasting distance. At this time, the vehicle controller issues a throttle off signal, and the truck coasts to and stops at the target parking space in an unpowered state.

The unpowered coasting distance of the vehicle depends a speed, weight, and tire performance of the vehicle, a road friction coefficient, etc. Here, data such as the speed, weight, and tire performance can be collected from a central control system of the truck, and the road friction coefficient can be pre-configured in the vehicle controller. After the vehicle controller obtains the data, it can calculate the unpowered coasting distance of the truck.

The above implementation in which the truck coasts to and stops at the target parking space in the unpowered state imposes higher requirements on the accuracy of the unpowered coasting distance. Once the unpowered coasting distance calculated by the vehicle controller is inaccurate, it is very likely that the truck cannot coast to and stop at the target parking space. In view of this, in order to further ensure that the truck can stop accurately at the target parking space, in some embodiments, the step S500 may also be performed as follows. The vehicle controller can issue a throttle off signal to control the throttle of the truck to be off when determining that the real-time distance from the truck to the target parking space is smaller than an unpowered coasting distance and a difference between them is smaller than or equal to a predetermined threshold, and issue a braking signal to control the truck to brake and stop at the target parking space when the real-time distance from the truck to the target parking space is smaller than a predetermining braking distance and a speed of the truck is greater than a predetermined speed.

In this embodiment, after issuing a throttle off signal to cause the truck to coast in the unpowered state, the vehicle controller can issue a braking signal to control the truck to brake and stop at the target parking space when the real-time distance from the truck to the target parking space is smaller than the predetermining braking distance and the speed of the truck is greater than the predetermined speed.

Here, the predetermined braking distance, the predetermined speed, and the braking signal have the following relationship. With the effect of the braking signal, the real-time distance traveled by the truck while the speed of the truck drops from the predetermined speed to zero equals exactly to the predetermined braking distance.

Since the braking distance of the vehicle depends on a braking force of the vehicle, a speed at the time of braking, a weight, and tire performance of the vehicle, and the braking force is directly dependent on the braking signal, the vehicle controller can calculate the predetermined braking distance, the predetermined speed and the braking signal of the vehicle based on historical braking data (e.g., braking speeds and braking distances in previous braking processes) of the vehicle and the data such as speed, weight and tire performance as collected from a central control system of the vehicle.

Example 1

Figure 5:
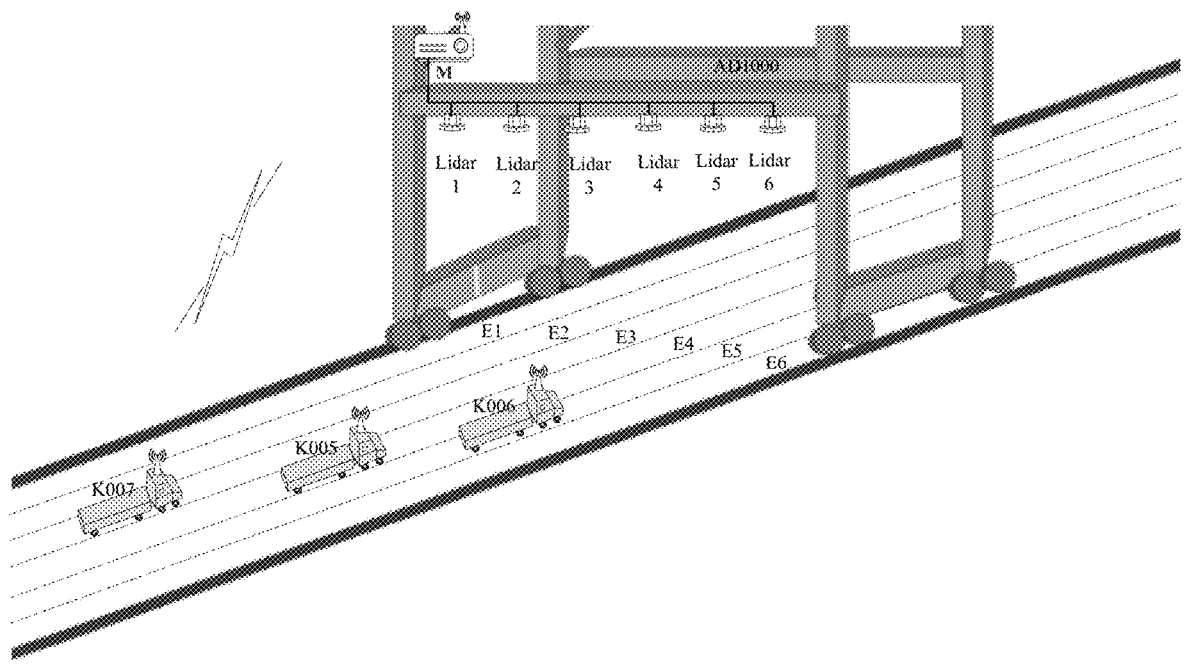
FIG. 5 schematically shows a truck accurately parked in a shore crane area when performing a task of unloading a container from a ship according to an embodiment of the present disclosure.

As shown in FIG. 5, a shore crane numbered AD1000 crosses six lanes numbered E1~E6, respectively. Six LiDARs, numbered Lidar1~Lidar6 respectively, are provided at the bottom of a connecting beam of the shore crane for scanning E1~E6, respectively. That is, each LiDAR is responsible for scanning one lane. A main controller M is connected to the LiDARs Lidar1~Lidar6, and is responsible for tasks of accurately parking trucks in the respective lanes under the shore crane AD1000.

At a certain time point, trucks, having numbers K005, K006, and K007 respectively, are moving in the lanes E1~E6. Among them, each of the trucks K005 and K006 carries a container and is performing a task of loading the container onto a ship, and the truck K007 carries no container and is not performing a task of loading/unloading a container onto/from a ship. The vehicle model of the truck K005 is SQ05, the vehicle model of the truck K006 is SQ06, and the vehicle model of the truck K007 is SQ07.

The main controller M executes the following operations in (1)~(5) at a predetermined frequency.

(1) The main controller M acquires the real-time point cloud data obtained by scanning using the LiDARs Lidar1~Lidar6, and clusters the real-time point cloud data to obtain sets of point clouds corresponding to the trucks K005, K006, and K007 respectively.

(2) The main controller M captures images of the respective trucks and performs visual identification on the images, to determine that the trucks K005 and K006 each carry a container and the truck K007 carries no container, and determine the vehicle numbers K005, K006, and K007 of the three trucks, respectively. The main controller M determines the vehicle models of the three trucks, respectively, based on a correspondence between vehicle models and vehicle numbers.

(3) The main controller M searches a first model library for the vehicle point cloud model MX-SQ05 matching the vehicle model SQ05 of the truck K005, searches the first model library for the vehicle point cloud model MX-SQ06 matching the vehicle model SQ06 of the truck K006, and searches a second model library for the vehicle point cloud model MX-SQ07 matching the vehicle model SQ07 of the truck K007.

(4) The main controller M applies the ICP algorithm to the set of point clouds for the truck K005 and the vehicle point cloud model MX-SQ05 to obtain a real-time distance L-K005 from the truck K005 to the target parking space; applies the ICP algorithm to the set of point clouds for the truck K006 and the vehicle point cloud model MX-SQ06 to obtain a real-time distance L-K006 from the truck K006 to the target parking space; and applies the ICP algorithm to the set of point clouds for the truck K007 and the vehicle point cloud model MX-SQ07 to obtain a real-time distance L-K007 from the truck K007 to the target parking space.

(5) The main controller M broadcasts a first message containing a data pair consisting of the vehicle number K005 and the real-time distance L-K005, a second message containing a data pair consisting of the vehicle number K006 and the real-time distance L-K006, and a third message containing a data pair consisting of the vehicle number K007 and the real-time distance L-K007.

Upon receiving the first message, the second message, and the third message broadcasted by the main controller M, the vehicle controller of the truck K005 first determines that the truck corresponding to itself is performing a task of loading a container onto a ship, then determines that the real-time distance L-K005 contained in the first message is the real-time distance from the truck corresponding to itself to the target parking space by comparing the vehicle number in each message with the vehicle number K005 of the truck corresponding to itself, and finally controls the truck K005 to stop accurately at the target parking space based on the real-time distance.

Upon receiving the first message, the second message, and the third message broadcasted by the main controller M, the vehicle controller of the truck K006 first determines that the truck corresponding to itself is performing a task of loading a container onto a ship, then determines that the real-time distance L-K006 contained in the second message is the real-time distance from the truck corresponding to itself to the target parking space by comparing the vehicle number in each message with the vehicle number K006 of the truck corresponding to itself, and finally controls the truck K006 to stop accurately at the target parking space based on the real-time distance.

Upon receiving the first message, the second message, and the third message broadcasted by the main controller M, the vehicle controller of the truck K007 determines that the truck corresponding to itself is not performing a task of loading/unloading a container onto/from a ship, and therefore discards the received messages. That is, the messages broadcasted by the main controller does not affect the normal moving condition of the truck K007.

When each of the trucks K005 and K006 has been parked accurately, the shore crane AD1000 hoists the container carried by the truck onto the ship to complete the task of loading the container onto the ship.

Example 2

Figure 6:
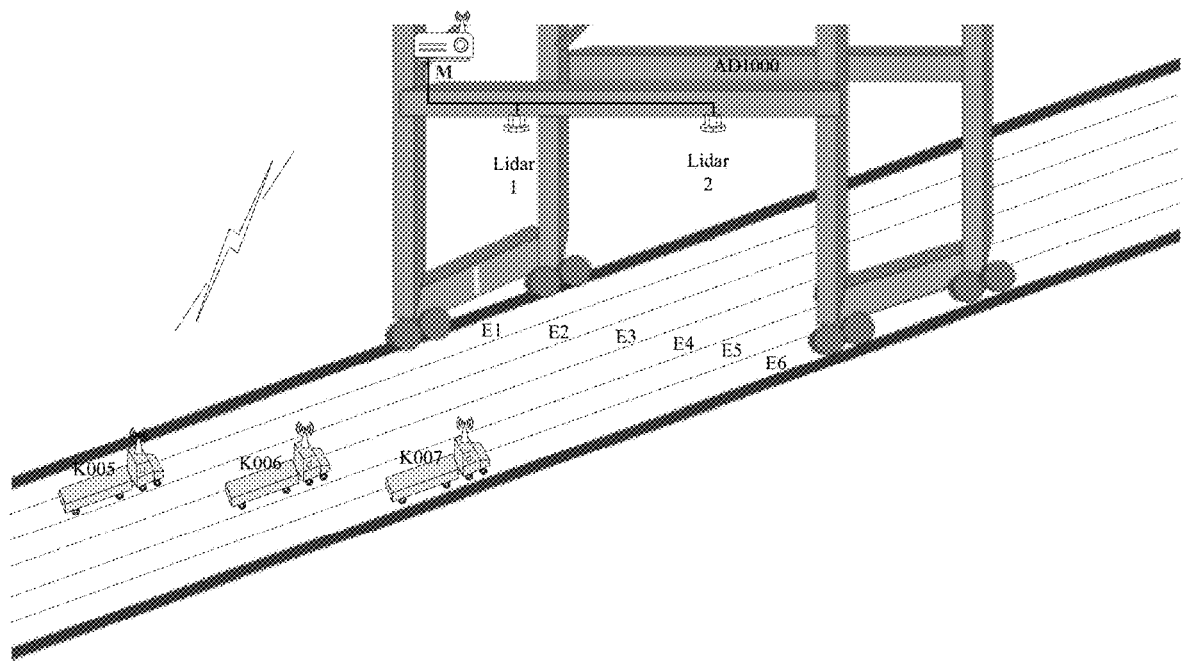
FIG. 6 schematically shows a truck accurately parked in a shore crane area when performing a task of unloading a container from a ship according to an embodiment of the present disclosure.

As shown in FIG. 6, a shore crane numbered AD1000 crosses six lanes numbered E1~E6, respectively. Two LiDARs, numbered Lidar1 and Lidar2 respectively, are provided at the bottom of a connecting beam of the shore crane. Lidar1 is responsible for scanning the lanes E1~E3, and Lidar2 is responsible for scanning the lanes E4~E6. That is, each LiDAR is responsible for scanning three lanes. A main controller M is connected to the LiDARs Lidar1 and Lidar2, and is responsible for tasks of accurately parking trucks in the respective lanes under the shore crane AD1000.

At a certain time point, three trucks, K005, K006, and K007, are moving in the lanes E2, E4, and E6 crossed by the shore crane AD1000. Among them, none of the trucks K005, K006, and K007 carries a container, each of the trucks K005 and K006 is performing a task of unloading a container from a ship, and the truck K007 is not performing a task of loading/unloading a container onto/from a ship. The vehicle model of the truck K005 is SQ05, the vehicle model of the truck K006 is SQ06, and the vehicle model of the truck K007 is SQ07.

The main controller M executes the following operations in (1)~(6) at a predetermined frequency.

(1) The main controller M acquires the real-time point cloud data obtained by scanning using the LiDARs Lidar1~Lidar2, and clusters the real-time point cloud data to obtain sets of point clouds corresponding to the trucks K005, K006, and K007 respectively.

(2) The main controller M captures images of the respective trucks and performs visual identification on the images, to determine that none of the trucks K005, K006, and K007 carries a container, and determine the vehicle numbers K005, K006, and K007 of the three trucks, respectively. The main controller M determines the vehicle models of the three trucks, respectively, based on a correspondence between vehicle models and vehicle numbers.

(3) The main controller M searches a second model library for the vehicle point cloud model MX-SQ05 matching the vehicle model SQ05 of the truck K005, searches the second model library for the vehicle point cloud model MX-SQ06 matching the vehicle model SQ06 of the truck K006, and searches the second model library for the vehicle point cloud model MX-SQ07 matching the vehicle model SQ07 of the truck K007.

(4) The main controller M applies the ICP algorithm to the set of point clouds for the truck K005 and the vehicle point cloud model MX-SQ05 to obtain a real-time distance L-K005 from the truck K005 to the target parking space; applies the ICP algorithm to the set of point clouds for the truck K006 and the vehicle point cloud model MX-SQ06 to obtain a real-time distance L-K006 from the truck K006 to the target parking space; and applies the ICP algorithm to the set of point clouds for the truck K007 and the vehicle point cloud model MX-SQ07 to obtain a real-time distance L-K007 from the truck K007 to the target parking space.

(5) The main controller M determines that the identifications of the lanes where the trucks K005, K006, and K007 are located are E2, E4, and E6, respectively, based on the sets of point clouds for the trucks K005, K006, and K007 and a known position of each lane crossed by the shore crane AD1000 relative to the LiDARs Lidar1 and Lidar2.

(6) The main controller M broadcasts a first message containing a data pair consisting of the lane identification E2 and the real-time distance L-K005, a second message containing a data pair consisting of the lane identification E4 and the real-time distance L-K006, and a third message containing a data pair consisting of the lane identification E6 and the real-time distance L-K007.

Upon receiving the first message, the second message, and the third message broadcasted by the main controller M, the vehicle controller of the truck K005 first determines that the truck corresponding to itself is performing a task of unloading a container from a ship, then determines that the real-time distance L-K005 contained in the first message is the real-time distance from the truck corresponding to itself to the target parking space by comparing the lane identification in each message with the lane where the truck corresponding to itself is located, and finally controls the truck K005 to stop accurately at the target parking space based on the real-time distance.

Upon receiving the first message, the second message, and the third message broadcasted by the main controller M, the vehicle controller of the truck K006 first determines that the truck corresponding to itself is performing a task of unloading a container from a ship, then determines that the real-time distance L-K006 contained in the second message is the real-time distance from the truck corresponding to itself to the target parking space by comparing the lane identification in each message with the lane where the truck corresponding to itself is located, and finally controls the truck K006 to stop accurately at the target parking space based on the real-time distance.

Upon receiving the first message, the second message, and the third message broadcasted by the main controller M, the vehicle controller of the truck K007 determines that the truck corresponding to itself is not performing a task of loading/unloading a container onto/from a ship, and therefore discards the received messages. That is, the messages broadcasted by the main controller does not affect the normal moving condition of the truck K007.

When each of the trucks K005 and K006 has been parked accurately, the shore crane AD1000 hoists a container from a ship onto a load board of each of the trucks K005 and K006 to complete the task of unloading the container from the ship.

Figure 7:
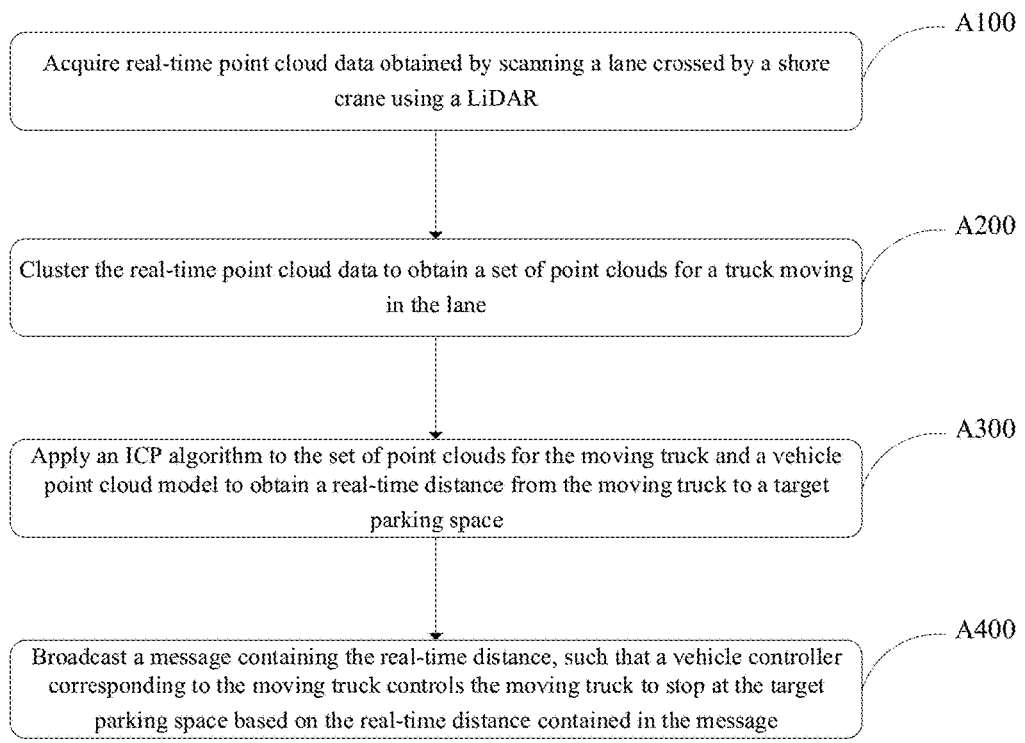
FIG. 7 schematically shows a flow of a method applied in a main controller for parking a truck accurately in a shore crane area according to an embodiment of the present disclosure.

Based on the same inventive concept, an embodiment of the present disclosure provides a method applied in a main controller for parking a truck accurately in a shore crane area. As shown in FIG. 7, the method includes the following steps.

At step A100, real-time point cloud data obtained by scanning a lane crossed by a shore crane using a LiDAR is acquired.

At step A200, the real-time point cloud data is clustered to obtain a set of point clouds for a truck moving in the lane.

At step A300, an ICP algorithm is applied to the set of point clouds for the moving truck and a vehicle point cloud model to obtain a real-time distance from the moving truck to a target parking space. The vehicle point cloud model is a set of point clouds obtained by scanning a truck parked at the target parking space using the LiDAR in advance.

At step A400, a message containing the real-time distance is broadcasted, such that a vehicle controller corresponding to the moving truck controls the moving truck to stop at the target parking space based on the real-time distance contained in the message.

In some embodiments, the operation of applying the ICP algorithm to the set of point clouds for the moving truck and the vehicle point cloud model may include: determining a vehicle model of the moving truck; selecting the vehicle point cloud model matching the vehicle model of the moving truck from a model library; and applying the ICP algorithm to the set of point clouds for the moving truck and the vehicle point cloud model matching the vehicle model of the moving truck. The model library includes a plurality of vehicle point cloud models obtained by scanning trucks of a plurality of different vehicle models that are parked at the target parking space using the LiDAR in advance.

In some embodiments, the operation of selecting the vehicle point cloud model matching the vehicle model of the moving truck from the model library may include: selecting, when determining that the moving truck carries a container, the vehicle point cloud model matching the vehicle model of the moving truck from a first model library, the first model library including a plurality of vehicle point cloud models obtained by scanning trucks of the plurality of different vehicle models that are parked at the target parking space and carrying containers using the LiDAR in advance; and selecting, when determining that the moving truck carries no container, the vehicle point cloud model matching the vehicle model of the moving truck from a second model library, the second model library including a plurality of vehicle point cloud models obtained by scanning trucks of the plurality of different vehicle models that are parked at the target parking space and carrying no container using the LiDAR in advance.

In some embodiments, the operation of determining the vehicle model of the moving truck may include: capturing an image of the moving truck; performing visual identification on the image to obtain a vehicle identification; and determining the vehicle model of the moving truck based on a known correspondence between vehicle identifications and vehicle models.

In some embodiments, the operation of determining the vehicle model of the moving truck may include: capturing an image of a head of the moving truck; and performing visual identification on the image of the head to determine the vehicle model of the moving truck.

In some embodiments, the operation of determining the vehicle model of the moving truck may include: reading the vehicle model of the moving truck as stored in a Radio Frequency Identification (RFID) tag provided on the moving truck using an RFID reader.

In some embodiments, it may be determined whether the moving truck carries a container by: capturing an image of the moving truck; and performing visual identification on the image to determine whether the moving truck carries a container.

In some embodiments, the operation of applying the ICP algorithm to the set of point clouds for the moving truck and the vehicle point cloud model to obtain the real-time distance from the moving truck to the target parking space may include: calculating a translation matrix from the set of point clouds for the moving truck to the vehicle point cloud model using the ICP algorithm; and obtaining the real-time distance from the moving truck to the target parking space based on the translation matrix.

In some embodiments, the operation of calculating the translation matrix from the set of point clouds for the moving truck to the vehicle point cloud model using the ICP algorithm may include: determining an initial translation matrix, the initial translation matrix being a matrix for translating an average center of a predetermined number of foremost points in a moving direction of the moving truck in the set of point clouds for the moving truck to an average center of the predetermined number of foremost points in the moving direction in the vehicle point cloud model, coordinates of the average center being average values of coordinates of the predetermined number of points; and performing iterative calculation on the set of point clouds for the moving truck and the vehicle point cloud model based on the initial translation matrix, to obtain the translation matrix from the set of point clouds for the moving truck to the vehicle point cloud model.

In some embodiments, the vehicle point cloud model may be determined by: scanning a truck that moves towards the target parking space and finally stops at the target parking space using the LiDAR in advance; converting point cloud data when the truck has not reached the target parking space into a coordinate system for point cloud data when the truck reaches the target parking space; and determining a set of point clouds obtained after the converting as the vehicle point cloud model.

In some embodiments, the operation of scanning the truck that moves towards the target parking space and finally stops at the target parking space using the LiDAR in advance may include: scanning the truck that moves towards a predetermined parking marking line and stops in accordance with the parking marking line.

In some embodiments, said stopping in accordance with the parking marking line may include: stopping when a rear side plane of a load board of the truck is on a same vertical plane as the parking marking line.

In some embodiments, the method may further include: determining an identification of the lane where the moving truck is located based on the set of point clouds for the moving truck and a known position of each lane crossed by the shore crane relative to the LiDAR. The operation of broadcasting the message containing the real-time distance may include broadcasting the message containing a data pair consisting of the identification of the lane where the moving truck is located and the real-time distance.

In some embodiments, the method may further include: obtaining a vehicle identification of the moving truck. The operation of broadcasting the message containing the real-time distance may include broadcasting the message containing a data pair consisting of the vehicle identification of the moving truck and the real-time distance.

In some embodiments, the operation of obtaining the vehicle identification of the moving truck may include: capturing an image of the moving truck; and performing visual identification on the image to determine the vehicle identification.

In some embodiments, the operation of obtaining the vehicle identification of the moving truck may include: reading the vehicle identification of the moving truck as stored in a Radio Frequency Identification (RFID) tag provided on the moving truck using an RFID reader.

In some embodiments, the operation of capturing the image of the moving truck may include: capturing an image of a predetermined area of a vehicle body of the moving truck.

In some embodiments, the predetermined area of the vehicle body may have the vehicle identification formed by a reflective coating.

In some embodiments, the operation of broadcasting the message containing the real-time distance may include: broadcasting the message containing the real-time distance via a Vehicle to Everything (V2X) device.

The method applied to a main controller for parking a truck accurately in a shore crane area as shown in FIG. 7 is implemented based on the same inventive concept as the above method for accurately parking a truck in a shore crane area as shown in FIG. 2 and has the same non-limiting embodiments as the above method for accurately parking a truck in a shore crane area as shown in FIG. 2. For further details, reference can be made to the method for accurately parking a truck in a shore crane area as described above in connection with FIG. 2 and the description thereof will be omitted here.

Figure 8:
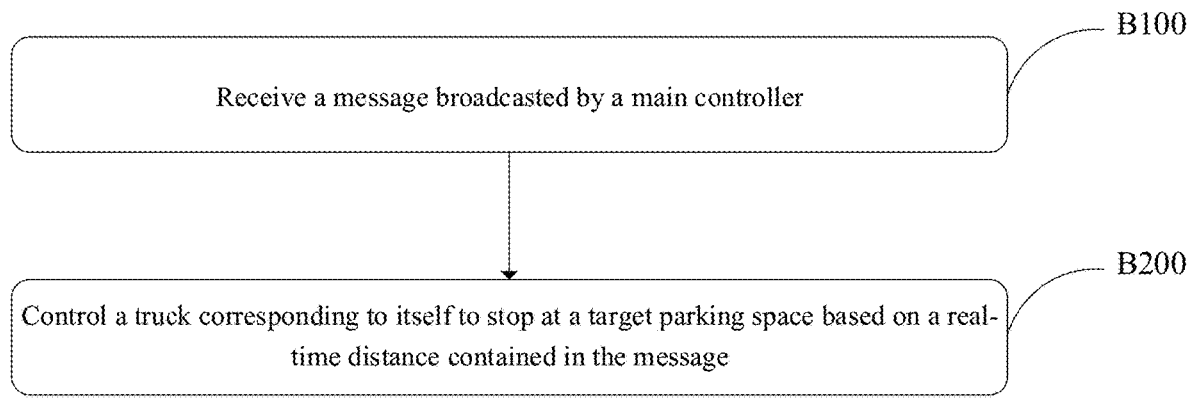
FIG. 8 schematically shows a flow of a method applied in a vehicle controller for parking a truck accurately in a shore crane area according to an embodiment of the present disclosure.

Based on the same inventive concept, the present disclosure also provides a method applied in a vehicle controller for parking a truck accurately in a shore crane area. As shown in FIG. 8, the method includes the following steps.

At step B100, a message broadcasted by a main controller is received.

At step B200, a truck corresponding to itself is controlled to stop at a target parking space based on a real-time distance contained in the message.

The message contains the real-time distance from the truck moving in a lane crossed by a shore crane to a target parking space. The real-time distance is calculated by the main controller by: acquiring real-time point cloud data obtained by scanning the lane crossed by the shore crane using a LiDAR; clustering the real-time point cloud data to obtain a set of point clouds for the truck moving in the lane; and applying an ICP algorithm to the set of point clouds for the moving truck and a vehicle point cloud model to obtain the real-time distance from the moving truck to a target parking space. The vehicle point cloud model is a set of point clouds obtained by scanning a truck parked at the target parking space using the LiDAR in advance.

In some embodiments, the operation of controlling the truck corresponding to itself to stop at the target parking space based on the real-time distance contained in the message may include: determining a real-time distance from the truck corresponding to itself to a target shore crane based on positioning data collected by a vehicle-mounted positioning device on the truck corresponding to itself and position information of the target shore crane, the target shore crane being a shore crane for hoisting a container in a task of loading/unloading the container onto/from a ship as performed by the truck corresponding to itself; and comparing the real-time distance from the truck corresponding to itself to the target shore crane with the real-time distance in the message, and if a difference between them is smaller than a predetermined threshold, controlling the truck corresponding to itself to stop at the target parking space based on the real-time distance contained in the message.

In some embodiments, the method may further include: obtaining the position information of the target shore crane from a received command for the task of loading/unloading the container onto/from the ship.

In some embodiments, the message may contain a data pair consisting of an identification of a lane where the moving truck is located and the real-time distance. The operation of controlling the truck corresponding to itself to stop at the target parking space based on the real-time distance contained in the message may include: controlling, when determining that a lane where the truck corresponding to itself is located corresponds to the identification of the lane contained in the message, the truck corresponding to itself to stop at the target parking space based on the real-time distance in the data pair containing the identification of the lane.

In some embodiments, the message may contain a data pair consisting of a vehicle identification of the moving truck and the real-time distance. The operation of controlling the truck corresponding to itself to stop at the target parking space based on the real-time distance contained in the message may include: controlling, when determining that a vehicle identification of the truck corresponding to itself corresponds to the vehicle identification contained in the message, the truck corresponding to itself to stop at the target parking space based on the real-time distance in the data pair containing the vehicle identification.

In some embodiments, the method may further include, subsequent to receiving the message broadcasted by the main controller, and prior to controlling the truck corresponding to itself to stop at the target parking space based on the real-time distance contained in the message: determining whether the truck corresponding to itself is performing a task of loading/unloading a container onto/from a ship; and discarding the message when the truck corresponding to itself is not performing a task of loading/unloading a container onto/from a ship.

In some embodiments, the operation of receiving the message broadcasted by the main controller may include: receiving the message via a V2X device.

The method applied to a vehicle controller for parking a truck accurately in a shore crane area as shown in FIG. 8 is implemented based on the same inventive concept as the above method for accurately parking a truck in a shore crane area as shown in FIG. 2 and has the same non-limiting embodiments as the above method for accurately parking a truck in a shore crane area as shown in FIG. 2. For further details, reference can be made to the method for accurately parking a truck in a shore crane area as described above in connection with FIG. 2 and the description thereof will be omitted here.

Based on the same inventive concept, an embodiment of the present disclosure also provides a computer readable storage medium having a computer program stored thereon. The computer program, when executed by a processor, implements the steps in the method applied in a main controller for parking a truck accurately in a shore crane area. The computer readable storage medium may be, for example, but not limited to, an electrical, magnetic, optical, electromagnetic, infrared, or semiconductor system, apparatus, or device, or any combination thereof. In some embodiments, the computer readable storage medium may be an electrical connection with one or more wires, a portable disk, a hard disk, a Random Access Memory (RAM), a Read-Only Memory (ROM), an Erasable Programmable Read-Only Memory (EPROM or flash memory), an optical fiber, a portable Compact Disc Read-Only Memory (CD-ROM), an optical storage device, a magnetic storage device, or any suitable combination thereof.

Based on the same inventive concept, an embodiment of the present disclosure also provides a computer readable storage medium having a computer program stored thereon. The computer program, when executed by a processor, implements the steps in the method applied in a vehicle controller for parking a truck accurately in a shore crane area. The computer readable storage medium may be, for example, but not limited to, an electrical, magnetic, optical, electromagnetic, infrared, or semiconductor system, apparatus, or device, or any combination thereof. In some embodiments, the computer readable storage medium may be an electrical connection with one or more wires, a portable disk, a hard disk, a Random Access Memory (RAM), a Read-Only Memory (ROM), an Erasable Programmable Read-Only Memory (EPROM or flash memory), an optical fiber, a portable Compact Disc Read-Only Memory (CD-ROM), an optical storage device, a magnetic storage device, or any suitable combination thereof.

Exemplary Devices

Based on the same inventive concept, an embodiment of the present disclosure also provides a main controller. The main controller includes a first processor, a first memory, and a computer program stored on the first memory and executable on the first processor. The first processor is configured to, when executing the computer program, perform the method applied in a main controller for parking a truck accurately in a shore crane area as shown in FIG. 7.

The method performed by executing the computer program in the first memory is implemented based on the same inventive concept as the above method for accurately parking a truck in a shore crane area as shown in FIG. 2 and has the same non-limiting embodiments as the above method for accurately parking a truck in a shore crane area as shown in FIG. 2. For further details, reference can be made to the method applied in a main controller for accurately parking a truck in a shore crane area as described above in connection with FIG. 2 and the description thereof will be omitted here.

Optionally, in the present disclosure, the first processor may be implemented as a circuit, a chip or any other electronic component. For example, the first processor may also include one or more microcontrollers, one or more Field Programmable Gate Arrays (FPGAs), one or more Application Specific Integrated Circuits (ASICs), one or more Digital Signal Processors (DSPs), one or more integrated circuits, and the like.

Optionally, in the present disclosure, the first memory may be implemented as a circuit, a chip or any other electronic component. For example, the first memory can include one or more Read Only Memories (ROMs), Random Access Memories (RAMs), flash memories, Electrically Programmable ROMs (EPROMs), Electrically Programmable and Erasable ROMs (EEPROMs), embedded Multi-Media Cards (eMMCs), hard drives or any volatile or non-volatile mediums.

In an embodiment of the present disclosure, the main controller may be a computer device in the form of a server, a PC, a portable computer, a tablet computer, a PDA, or an iMac.

Based on the same inventive concept, an embodiment of the present disclosure also provides a vehicle controller. The vehicle controller includes a second processor, a second memory, and a computer program stored on the second memory and executable on the second processor. The second processor is configured to, when executing the computer program, perform the method applied in a vehicle controller for parking a truck accurately in a shore crane area as shown in FIG. 8.

The method performed by executing the computer program in the second memory is implemented based on the same inventive concept as the above method for accurately parking a truck in a shore crane area as shown in FIG. 2 and has the same non-limiting embodiments as the above method for accurately parking a truck in a shore crane area as shown in FIG. 2. For further details, reference can be made to the method applied in a vehicle controller for accurately parking a truck in a shore crane area as described above in connection with FIG. 2 and the description thereof will be omitted here.

Optionally, in the present disclosure, the second processor may be implemented as a circuit, a chip or any other electronic component. For example, the second processor may also include one or more microcontrollers, one or more Field Programmable Gate Arrays (FPGAs), one or more Application Specific Integrated Circuits (ASICs), one or more Digital Signal Processors (DSPs), one or more integrated circuits, and the like.

Optionally, in the present disclosure, the second memory may be implemented as a circuit, a chip or any other electronic component. For example, the second memory can include one or more Read Only Memories (ROMs), Random Access Memories (RAMs), flash memories, Electrically Programmable ROMs (EPROMs), Electrically Programmable and Erasable ROMs (EEPROMs), embedded Multi-Media Cards (eMMCs), hard drives or any volatile or non-volatile mediums.

In an embodiment of the present disclosure, the vehicle controller may be a Digital Signal Processing (DSP), a Field-Programmable Gate Array (FPGA) controller, an industrial computer, a vehicle-mounted computer, an Electronic Control Unit (ECU), ARM, or a Vehicle Control Unit (VCU), etc. The present disclosure is not limited to any of these examples.

Figure 9:
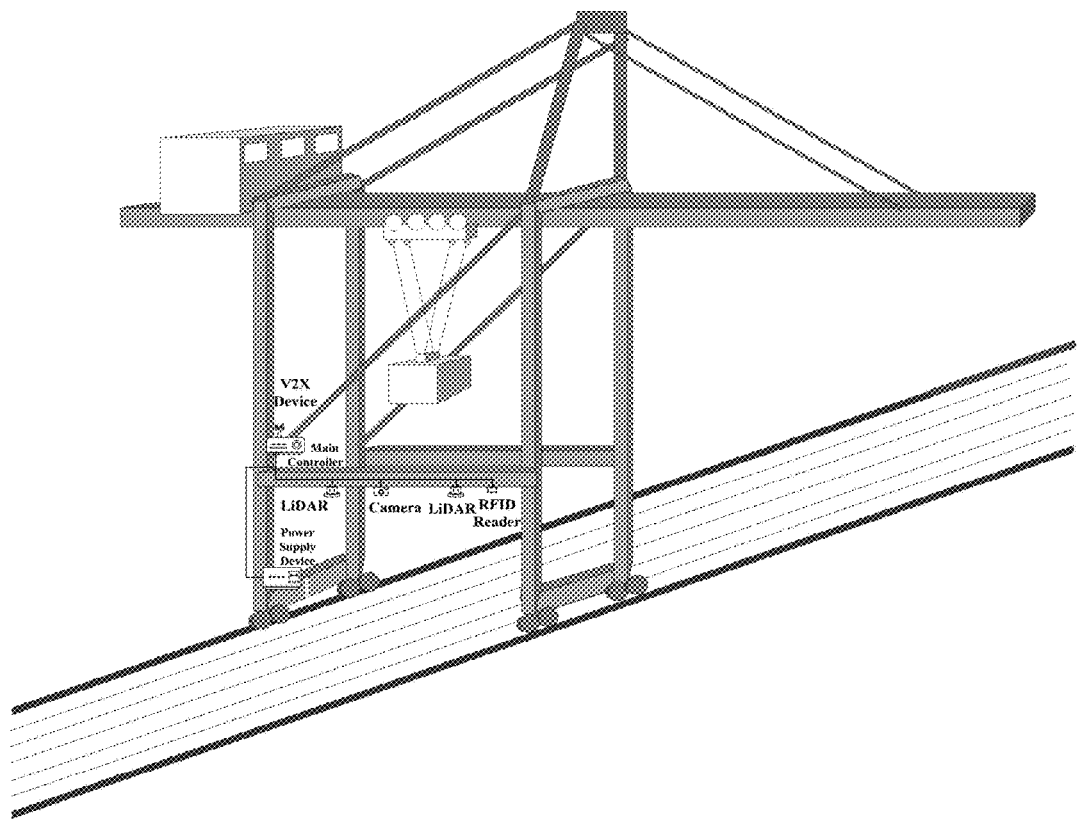
FIG. 9 schematically shows a shore crane according to an embodiment of the present disclosure.

Based on the same inventive concept, an embodiment of the present disclosure also provides a shore crane. As shown in FIG. 9, the shore crane is provided with a LiDAR and a main controller.

Here, the LiDAR and the main controller can be provide on a bridge frame, a sea side door frame, a land side door frame, a door frame beam, or a connecting beam of the shore crane. The LiDAR is configured to scan a lane crossed by the shore crane. The main controller is configured to acquire real-time point cloud data obtained by scanning a lane crossed by the shore crane using the LiDAR; cluster the real-time point cloud data to obtain a set of point clouds for a truck moving in the lane; apply an ICP algorithm to the set of point clouds for the moving truck and a vehicle point cloud model to obtain a real-time distance from the moving truck to a target parking space; and broadcast a message containing the real-time distance, such that a vehicle controller corresponding to the moving truck controls the moving truck to stop at the target parking space based on the real-time distance contained in the message. The vehicle point cloud model is a set of point clouds obtained by scanning a truck parked at the target parking space using the LiDAR in advance.

In some embodiments, the shore crane may be further provided with a Vehicle to Everything (V2X) device connected to the main controller.

In some embodiments, the shore crane may be further provided with a power supply device configured to supply power to the main controller and/or the LiDAR.

In some embodiments, the power supply device may be configured to obtain power from a power supply system of the shore crane.

In some embodiments, in order to deal with an emergency such as a sudden power failure of the power supply system of the shore crane that causes the power supply device to be unable to supply power, the shore crane may be further provided with an Uninterruptible Power Supply (UPS) configured to supply power to the main controller and/or the LiDAR when the power supply device is off.

In some embodiments, the shore crane may be further provided with an RFID reader connected to the main controller.

In some embodiments, the shore crane may be further provided with a camera connected to the main controller.

Figure 10:
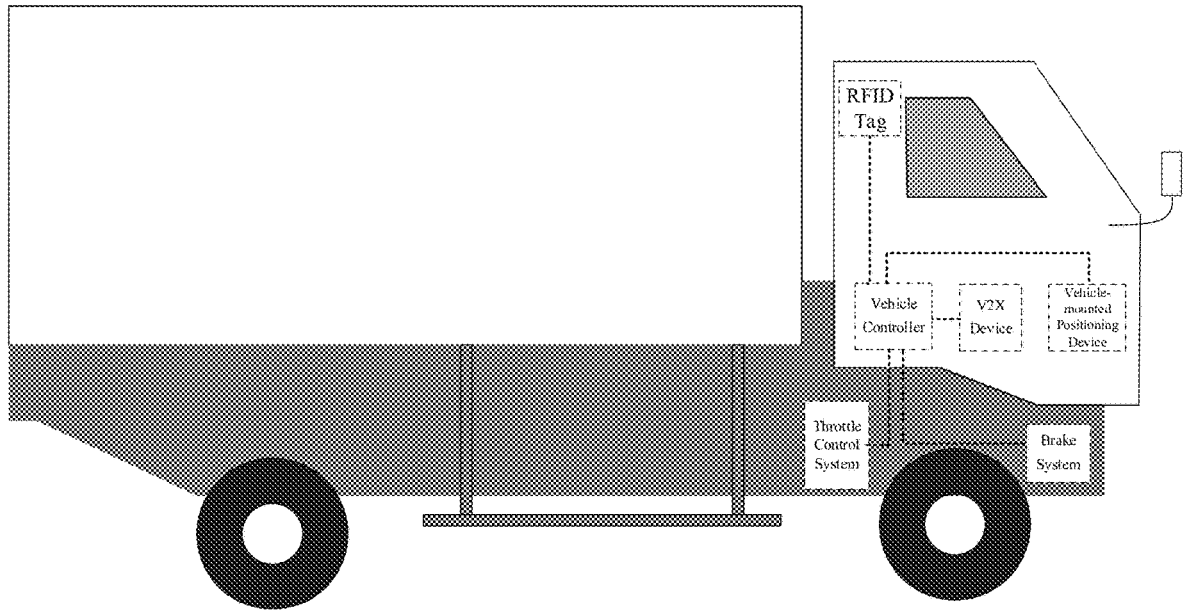
FIG. 10 schematically shows a vehicle according to an embodiment of the present disclosure.

Based on the same inventive concept, an embodiment of the present disclosure also provides a vehicle. As shown in FIG. 10, the vehicle is provided with a vehicle controller. The vehicle controller is configured to transmit a parking request for a truck to be parked; receive a real-time distance from the truck to be parked to a target parking space as transmitted by a main controller in response to the parking request; and control the truck to be parked to stop at the target parking space based on the real-time distance from the truck to be parked to the target parking space.

In some embodiments, the vehicle controller may be connected to a throttle control system and a brake system of the vehicle. That is, the vehicle controller indirectly achieves the purpose of controlling the truck to be parked to stop at the target parking space by controlling the throttle control system and the brake system of the vehicle.

In some embodiments, the vehicle may be further provided with a Vehicle to Everything (V2X) device connected to the vehicle controller.

In some embodiments, the vehicle may be further provided with a vehicle-mounted positioning device configured to obtain positioning data.

In some embodiments, the vehicle may be further provided with an RFID reader.

The vehicle can be a legacy vehicle driven by a human, such as a passenger car, a truck, an engineering vehicle, a fire engine, an ambulance, or a truck, or can be an autonomous vehicle. The vehicle can be a vehicle consuming traditional energy such as gasoline or diesel, or a vehicle consuming new energy such as electrical energy or solar energy. Here, the autonomous vehicle refers to any vehicle using the autonomous driving technology to carry people (such as passenger cars, buses, etc.) or goods (such as ordinary trucks, vans, closed trucks, tank trucks, flatbed trucks, container trucks, dump trucks, trucks with special structures, etc.) or provide special rescue functions (such as fire trucks, ambulances, etc.).

Exemplary System

Figure 11:
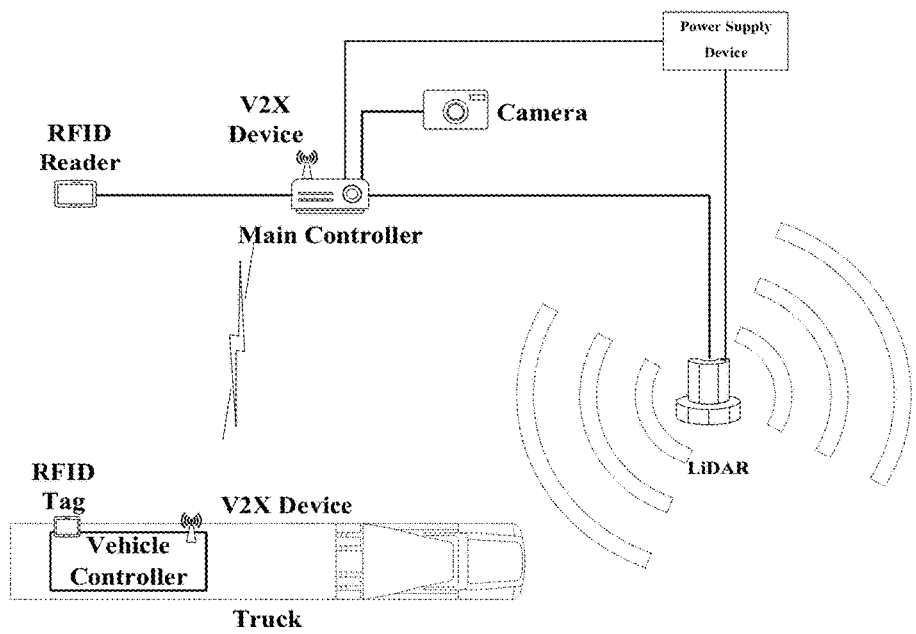
FIG. 11 schematically shows a system for parking a truck accurately in a shore crane area according to an embodiment of the present disclosure.

Based on the same inventive concept, an embodiment of the present disclosure also provides a system for parking a truck accurately in a shore crane area. As shown in FIG. 11, the system includes a main controller, a vehicle controller, and a LiDAR.

In the system for parking a truck accurately in a shore crane area, the LiDAR(s) can be 16-line, 32-line, or 64-line. The more laser beams there are, the easier it will be for the point cloud data obtained by scanning to cover the entire body of the scanned vehicle, and accordingly, the higher the cost will be. The hardware structures of the main controller and the vehicle controller have been described in "Exemplary Devices", and details thereof will be omitted here.

In order to allow the LiDAR(s) to the lane(s) crossed by the shore crane, in a specific implementation, the LiDAR(s) can be installed on a mechanical device or a professional support frame at the site of operations for loading/unloading containers onto/from ships. Furthermore, in order to eliminate the need for the process of repeatedly installing and debugging the LiDAR(s) when the shore crane moves, in some embodiments, the LiDAR(s) can be fixedly installed on the shore crane (for example, at the bottom of the connecting beam), such that when the shore crane moves, the position(s) of the LiDAR(s) relative to the shore crane will not change, and the LiDAR(s) can always scan the lane(s) crossed by the shore crane.

In some embodiments, the main controller can be fixedly installed on the shore crane (for example, at the bottom of the connecting beam, or a control room of the shore crane), and is connected to the LiDAR(s).

In some embodiments, the vehicle controller can be provided on the truck.

In some embodiments, the vehicle controller may be a device provided outside the truck, such as a device fixedly installed in a certain place, or a device installed on any mobile device. In these embodiments, the vehicle controller can control the power system of the truck to be parked using any wireless communication scheme, such as base station and WIFI, to indirectly control the truck to stop.

In some embodiments, as shown in FIG. 3(*a*), the main controller, the LiDAR(s), and the lane(s) can be configured to in the following mode: each LiDAR is configured to scan only one lane crossed by the shore crane, and each main controller is configured to acquire the real-time point cloud data obtained by scanning using only one LiDAR.

In some embodiments, as shown in FIG. 3(*b*), the main controller, the LiDAR(s), and the lane(s) can be configured to in the following mode: each LiDAR is configured to scan at least two lanes crossed by the shore crane, and each main controller is configured to acquire the real-time point cloud data obtained by scanning using only one LiDAR.

In some embodiments, as shown in FIG. 3(*c*), the main controller, the LiDAR(s), and the lane(s) can be configured to in the following mode: each LiDAR is configured to scan only one lane crossed by the shore crane, and each main controller is configured to acquire the real-time point cloud data obtained by scanning using at least two LiDARs.

In some embodiments, as shown in FIG. 3(*d*), the main controller, the LiDAR(s), and the lane(s) can be configured to in the following mode: each LiDAR is configured to scan at least two lanes crossed by the shore crane, and each main controller is configured to acquire the real-time point cloud data obtained by scanning using at least two LiDARs.

In some embodiments, as shown in FIG. 11, the system may further include: a V2X device connected to the main controller, and a V2X device connected to the vehicle controller.

In some embodiments, as shown in FIG. 11, the system may further include: a power supply device configured to supply power to the main controller and/or the LiDAR.

In some embodiments, the above power supply device can be configured to obtain power from a power supply system of the shore crane.

In some embodiments, the system may further include: an Uninterruptible Power Supply (UPS) configured to supply power to the main controller and/or the LiDAR when the power supply device is off.

In some embodiments, the system may further include: an RFID reader connected to the main controller and an RFID tag provided on the truck.

In some embodiments, the system may further include: a camera connected to the main controller.

In some embodiments, the camera may be provided on the shore crane.

The system for parking a truck accurately in a shore crane area is implemented based on the same inventive concept as the above method for accurately parking a truck in a shore crane area as shown in FIG. 2 and has the same non-limiting embodiments as the above method for accurately parking a truck in a shore crane area as shown in FIG. 2. For further details, reference can be made to the method for accurately parking a truck in a shore crane area as described above in connection with FIG. 2 and the description thereof will be omitted here.

The objects, solutions, and advantageous effects of the present disclosure have been described above in detail. It is to be understood that the above embodiments of the present disclosure are illustrative only, rather than limiting the scope of the present disclosure. All modifications, equivalent, or improvements made within the spirit and scope of the present disclosure are to be encompassed by the scope of the present disclosure.

It should be noted that while the operations of the methods according to the present disclosure have been described in particular orders in the figures, it does not require or imply that these operations are necessarily to be performed in the particular orders, or that all the illustrated operations are necessarily to be performed to achieve the desired results. Additionally or alternatively, some steps may be omitted, a plurality of steps may be combined into one step, and/or one step may be divided into a plurality of steps for execution.

It can be appreciated by those skilled in the art that various illustrative logical blocks, units, and steps listed in the embodiments of the present disclosure can be implemented by electronic hardware, computer software, or any combination thereof. To clearly illustrate the interchangeability of hardware and software, the various illustrative components, units and steps described above have been generally described with respect to their functions. Whether such functions are to be implemented by hardware or software depends on design requirements of particular applications and the overall system. It can be appreciated by those skilled in the art that for each particular application, the described functions can be implemented using various methods, and such implementations should not be construed as being beyond the scope of the embodiments of the present disclosure.

The various illustrative logic blocks, or units, or devices described in the embodiments of the present disclosure may be implemented by general purpose processors, digital signal processors, Application Specific Integrated Circuits (ASICs), field programmable gate arrays or other programmable logic devices, discrete gates or transistor logics, discrete hardware components, or any combination or design thereof, so as to implement or operate the described functions. A general purpose processor may be a microprocessor. Alternatively, the general purpose processor may be any conventional processor, controller, microcontroller, or state machine. The processor may also be implemented by a combination of computing devices, such as a digital signal processor and a microprocessor, a plurality of microprocessors, one or more microprocessors in combination with a digital signal processor core, or any other similar configurations.

The steps of the method or algorithm described in the embodiments of the present disclosure may be directly embedded in hardware or software modules executed by a processor, or any combination thereof. The software modules can be stored in a RAM, a flash memory, a ROM, an EPROM, an EEPROM, a register, a hard drive, a removable magnetic disk, a CD-ROM, or any other form of storage medium in the art. As an example, the storage medium can be coupled to a processor such that the processor can read information from the storage medium and write information to the storage medium. Alternatively, the storage medium can be integrated into the processor. The processor and the storage medium may be disposed in an ASIC, which can be provided in a user terminal. Alternatively, the processor and the storage medium may also be provided in different components in the user terminal.

In one or more exemplary designs, the functions described above in the embodiments of the present disclosure may be implemented in hardware, software, firmware, or any combination thereof. When implemented in software, these functions may be stored on a computer readable medium or transmitted as one or more instructions or codes to a computer readable medium. Computer readable mediums may include computer storage mediums and communication mediums that facilitates transfer of computer programs from one place to another. The storage medium can be any available medium that any general purpose or special computer can access. For example, such computer readable mediums may include, but not limited to: RAMs, ROMs, EEPROMs, CD-ROMs or other optical storages, magnetic disk storages or other magnetic storage devices, or any other medium that can be used for carrying or storing program codes in instructions, data structures or any other forms that can be read by a general purpose or special computer or a general purpose or special processor. In addition, any connection can be appropriately defined as a computer readable medium. For example, if the software is transmitted from a website, a server, or any other remote sources through a coaxial cable, a fiber optic cable, a twisted pair, a Digital Subscriber Line (DSL) or wirelessly via e.g., infrared, radio, or microwave, it is also included in the defined computer readable medium. The disks and discs include compact disks, laser discs, optical discs, DVDs, floppy disks, and Blu-ray discs. The disks typically replicate data magnetically, while the discs typically optically replicate data with a laser. Any combination of the above may also be included in a computer readable medium.

What is claimed is:

1. A method, comprising:
   acquiring real-time point cloud data by scanning a lane crossed by a shore crane using a LiDAR;
   clustering the real-time point cloud data to obtain a set of point clouds for a truck moving in the lane;
   obtaining a real-time distance from the moving truck to a target parking space based on the set of point clouds and a vehicle point cloud model; and
   broadcasting a message containing the real-time distance, such that a vehicle controller controls the moving truck to stop at the target parking space based on the real-time distance contained in the message.

2. The method of claim 1, wherein obtaining the real-time distance from the moving truck to the target parking space based on the set of point clouds and the vehicle point cloud model comprises:
   determining a vehicle model of the moving truck;
   selecting the vehicle point cloud model matching the vehicle model of the moving truck from a model library; and
   applying an Iterative Closest Point (ICP) algorithm to the set of point clouds and the vehicle point cloud model matching the vehicle model of the moving truck, wherein the model library comprises a plurality of vehicle point cloud models obtained by scanning trucks of a plurality of different vehicle models that are parked at the target parking space using the LiDAR in advance.

3. The method of claim 2, wherein the model library comprises a first model library and a second model library, and selecting the vehicle point cloud model matching the vehicle model of the moving truck from the model library comprises:

selecting, in response to determining that the moving truck carries a container, the vehicle point cloud model matching the vehicle model of the moving truck from the first model library, wherein the first model library comprises a first plurality of vehicle point cloud models obtained by scanning trucks of the plurality of different vehicle models that are parked at the target parking space and carrying containers using the LiDAR in advance; and selecting, in response to determining that the moving truck carries no container, the vehicle point cloud model matching the vehicle model of the moving truck from the second model library, wherein the second model library comprises a second plurality of vehicle point cloud models obtained by scanning trucks of the plurality of different vehicle models that are parked at the target parking space and carrying no container using the LiDAR in advance.

4. The method of claim 2, wherein determining the vehicle model of the moving truck comprises:

capturing an image of the moving truck;

performing visual identification on the image to obtain a vehicle identification; and determining the vehicle model of the moving truck based on the vehicle identification.

5. The method of claim 2, wherein determining the vehicle model of the moving truck comprises:

capturing an image of a head of the moving truck; and performing visual identification on the image of the head to determine the vehicle model of the moving truck.

6. The method of claim 2, wherein determining the vehicle model of the moving truck comprises:

reading the vehicle model of the moving truck as stored in a Radio Frequency Identification (RFID) tag provided on the moving truck using an RFID reader.

7. The method of claim 1, wherein obtaining the real-time distance from the moving truck to the target parking space based on the set of point clouds and the vehicle point cloud model comprises:

calculating a translation matrix from the set of point clouds to the vehicle point cloud model using an Iterative Closest Point (ICP) algorithm; and obtaining the real-time distance from the moving truck to the target parking space based on the translation matrix.

8. The method of claim 7, wherein calculating the translation matrix from the set of point clouds to the vehicle point cloud model using the ICP algorithm comprises:

determining an initial translation matrix, the initial translation matrix being a matrix for translating an average center of a predetermined number of foremost points in a moving direction of the moving truck in the set of point clouds to an average center of the predetermined number of foremost points in the moving direction in the vehicle point cloud model, wherein coordinates of the average center are average values of coordinates of the predetermined number of foremost points; and performing iterative calculation on the set of point clouds and the vehicle point cloud model based on the initial translation matrix, to obtain the translation matrix from the set of point clouds to the vehicle point cloud model.

9. The method of claim 1, wherein the vehicle point cloud model is determined by:

scanning a further truck that moves towards the target parking space and finally stops at the target parking space using the LiDAR;

converting a first set of point cloud data acquired when the further truck has not reached the target parking space into a coordinate system for a second set of point cloud data acquired when the further truck reaches the target parking space to obtain a further set of point clouds; and determining the further set of point clouds as the vehicle point cloud model.

10. The method of claim 1, wherein the lane crossed by the shore crane comprises a plurality of lanes, the method further comprising:

determining an identification of one of the plurality of lanes where the moving truck is located based on the set of point clouds and position relationship of the plurality of lanes relative to the LiDAR, wherein the message further contains the identification of the lane where the moving truck is located.

11. The method of claim 1, further comprising:

obtaining a vehicle identification of the moving truck, wherein the message further contains the vehicle identification of the moving truck.

12. A vehicle, comprising a vehicle controller, wherein the vehicle controller comprises:

a processor, a memory, and a computer program stored on the memory and executable on the processor, wherein the processor is configured to, when executing the computer program, perform an operation comprising:

receiving a message broadcasted by a main controller, wherein the message contains a real-time distance from the vehicle to a target parking space; and controlling the vehicle to stop at the target parking space based on the real-time distance contained in the message, wherein the real-time distance is calculated by:

acquiring real-time point cloud data by scanning a lane crossed by a shore crane using a LiDAR;

clustering the real-time point cloud data to obtain a set of point clouds for the vehicle moving in the lane; and obtaining the real-time distance based on the set of point clouds and a vehicle point cloud model.

13. The vehicle of claim 12, wherein controlling the vehicle to stop at the target parking space based on the real-time distance comprises:

determining a further real-time distance from the vehicle to the shore crane based on positioning data collected by a vehicle-mounted positioning device on the vehicle and position information of the shore crane;

comparing the further real-time distance with the real-time distance contained in the message; and in response to a difference between the further real-time distance with the real-time distance contained in the message being smaller than a predetermined threshold, controlling the vehicle to stop at the target parking space based on the real-time distance contained in the message.

14. The vehicle of claim 13, further comprising:
obtaining the position information of the shore crane from a received command for a task of loading or unloading a container.

15. The vehicle of claim 12, wherein the message further contains a lane identification and the lane crossed by the shore crane comprises a plurality of lanes, and
wherein controlling the vehicle to stop at the target parking space based on the real-time distance contained in the message comprises:
in response to determining that one of the plurality of lanes where the vehicle is located corresponds to the lane identification, controlling the vehicle to stop at the target parking space based on the real-time distance contained in the message.

16. The vehicle of claim 12, wherein the message further contains a vehicle identification and the lane crossed by the shore crane comprises a plurality of lanes, and
wherein controlling the vehicle to stop at the target parking space based on the real-time distance contained in the message comprises:
obtaining an identification of the vehicle; and
in response to determining that the obtained identification of the vehicle corresponds to the vehicle identification, controlling the vehicle to stop at the target parking space based on the real-time distance contained in the message.

17. The vehicle of claim 12, wherein the operation further comprises:
determining whether the vehicle is performing a task of loading or unloading a container; and
discarding the message in response to the vehicle being not performing the task.

18. The vehicle of claim 12, further comprising a throttle control system and a brake system, wherein the vehicle controller is connected to the throttle control system and the brake system.

19. The vehicle of claim 12, further comprising a Vehicle to Everything (V2X) device connected to the vehicle controller.

20. A non-transitory computer readable storage medium, having a computer program stored thereon, the computer program, when executed by a processor, causes the processor to:
acquire real-time point cloud data by scanning a lane crossed by a shore crane using a LiDAR;
cluster the real-time point cloud data to obtain a set of point clouds for a truck moving in the lane;
obtain a real-time distance from the moving truck to a target parking space based on the set of point clouds and a vehicle point cloud model; and
broadcast a message containing the real-time distance, such that a vehicle controller controls the moving truck to stop at the target parking space based on the real-time distance contained in the message.

* * * * *